(12) United States Patent
Lemley et al.

(10) Patent No.: US 11,647,112 B2
(45) Date of Patent: May 9, 2023

(54) PROVISIONING TOOL—CALL CENTER-BASED AUTOMATED INTERFACE WITH NETWORK SWITCHES FOR INTERNET SERVICE DIAGNOSTICS AND PROVISIONING

(71) Applicant: CenturyLink Intellectual Property LLC, Broomfield, CO (US)

(72) Inventors: Jaime D. Lemley, Apopka, FL (US); Rob Preston, Mechanicsburg, PA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 113 days.

(21) Appl. No.: 17/491,186

(22) Filed: Sep. 30, 2021

(65) Prior Publication Data
US 2023/0030263 A1    Feb. 2, 2023

Related U.S. Application Data

(60) Provisional application No. 63/227,224, filed on Jul. 29, 2021.

(51) Int. Cl.
*H04M 3/22* (2006.01)
*H04M 3/42* (2006.01)
*H04M 3/51* (2006.01)
*G06F 3/0482* (2013.01)

(52) U.S. Cl.
CPC ....... *H04M 3/2272* (2013.01); *H04M 3/4217* (2013.01); *H04M 3/42161* (2013.01); *H04M 3/5191* (2013.01); *G06F 3/0482* (2013.01)

(58) Field of Classification Search
None
See application file for complete search history.

(56) References Cited

U.S. PATENT DOCUMENTS 6,823,479 B1 * 11/2004 McElhaney, Jr. ... H04L 41/0631
714/4.2
7,158,613 B2 * 1/2007 Dunbar ................ H04M 3/323
370/251

(Continued)

FOREIGN PATENT DOCUMENTS

EP    1885083 A1 *  2/2008  ......... H04L 12/2697

*Primary Examiner* — Quoc D Tran

(57) ABSTRACT

Novel tools and techniques are provided for implementing call center-based automated interface with network switches for Internet service diagnostics and provisioning. In various embodiments, in response to receiving a request by a call center user to access an Internet service customer account, a computing system may access information regarding the Internet service customer account that is stored in a database, may identify a network switch that is configured to provide Internet service to customer premises equipment ("CPE") disposed at a customer premises associated with the customer, based at least in part on the accessed information, and may autonomously access, from other databases, information associated with the Internet service customer account and with a network profile. The computing system may integrate the accessed information, may generate and present a user interface ("UI") displaying the accessed information, and may autonomously initiate one or more diagnosis and repair procedures.

20 Claims, 15 Drawing Sheets

(56) References Cited

U.S. PATENT DOCUMENTS

| | | | | |
|---|---|---|---|---|
| 7,818,283 B1* | 10/2010 | Bajpay | ................ | H04L 43/0817 |
| | | | | 707/E17.005 |
| 8,675,822 B2* | 3/2014 | Rives | .................... | G06Q 10/06 |
| | | | | 379/9.03 |
| 2006/0227714 A1* | 10/2006 | Griffin | .................... | H04L 43/50 |
| | | | | 370/241 |
| 2007/0041554 A1* | 2/2007 | Newman | ................. | H04L 43/50 |
| | | | | 379/1.01 |
| 2008/0198754 A1* | 8/2008 | Savoor | .................... | H04L 43/50 |
| | | | | 370/245 |
| 2017/0339040 A1* | 11/2017 | Ganesan | ............. | H04L 43/0888 |

* cited by examiner

| Provisioning Tool UI | Network Switch Access | Network Switch Type | Switch ID | Territory |
|---|---|---|---|---|
| | Location 1<br>LOGIN | DSLAM<br>(HW Type D; SW Type F) | XXXXXXX | Region C |
| Account # | Customer Name | Caller ID Name | CPE Type | |
| 1 321 123 4567 | J. Lemley | J_Lemley | DSL Modem<br>(Model # WWWWWWW) | |
| Billing Address | Billing Name | Payment Method | Plan Information | |
| YYYY YY, Apopka, FL<br>ZZZZZ | J. Lemley | Show Payment<br>Details | Show Plan<br>Details | |
| Show Provisioning &<br>Line Stats | Show Network<br>Profile Information | Request BSW<br>Ticket | Change Plan<br>Features | |
| Error: _____<br>Error: _____ | | | | Master Fix Option |

Fig. 3A

| Provisioning & Line Stats | | Port Prov Parameters | Port Prov Stats |
|---|---|---|---|
| Line Parameters | Line Stats | | |
| provRateDown | 11776 kbps | dataRateDown | 11776 kbps |
| provRateUp | 1024 kbps | dataRateUp | 1024 kbps |
| syncRateDown | 11775 kbps | purchRateDown | 10000 kbps |
| SyncRateUp | 1021 kbps | purchRateUp | 896 kbps |
| noiseMarginDown | 17.6 dBm | enabled | True |
| noiseMarginUp | 16.2 dBm | bondedGroupId | null |
| attenuationDown | 2.5 | matchesPurchased | True |
| attenuationUp | 3 | hasIssue | False |
| inSync | True | detectedIssues | [ ] |
| hasLineIssue | False | vccHasIssue | False |
| detectedIssues | [ ] | vccDetectedIssues | [ ] |

Fig. 3B

| Provisioning & Line Stats | | | |
|---|---|---|---|
| Line Parameters | Line Stats | Port Prov Parameters | Port Prov Stats |
| provRateDown | 5888 kbps | dataRateDown | 5888 kbps |
| provRateUp | 896 kbps | dataRateUp | 896 kbps |
| syncRateDown | 0 kbps | purchRateDown | 10000 kbps |
| SyncRateUp | 0 kbps | purchRateUp | 896 kbps |
| noiseMarginDown | 0 dBm | enabled | False |
| noiseMarginUp | 0 dBm | bondedGroupId | null |
| attenuationDown | 0 | matchesPurchased | False |
| attenuationUp | 0 | hasIssue | True |
| inSync | False | detectedIssues | [Admin status disabled; Speed profile does not match records] |
| hasLineIssue | True | vccHasIssue | True |
| detectedIssues | [Not in sync] | vccDetectedIssues | [Cross connects not found] |

Fig. 3C

| Provisioning & Line Stats | | | |
|---|---|---|---|
| ONT Parameters | ONT Stats | Status Parameters | Status Stats |
| id | 1010103 | performance | |
| adminStatus | Enabled | cur24hr | |
| adminState | Enabled-no-alarms | measuredTimeString | 14hr 30min 0sec |
| serialNumber | CXNK306B3A | upstream | |
| regId | 7001010103 | bip_errors | 0 |
| subscriberId | 4078148486 | missed_burst | 84 |
| description | 4078148486 | missed_burst_seconds | 1 |
| BatteryPresent | True | hec_errors | 0 |
| profile | | ... | ... |
| id | 157 | hasIssues | False |
| ... | ... | detectedIssues | [ ] |

Fig. 3E

| Provisioning & Line Stats | | | |
|---|---|---|---|
| ONT Parameters | ONT Stats | Status Parameters | Status Stats |
| id | 1010102 | performance | |
| adminStatus | Enabled | cur24hr | |
| adminState | Enabled | measuredTimeString | 21hr 45min 0sec |
| serialNumber | CXNK23F882 | upstream | |
| regId | 7001010102 | bip_errors | 0 |
| subscriberId | 4078148483 | missed_burst | 0 |
| description | 4078148483 | missed_burst_seconds | 0 |
| BatteryPresent | True | hec_errors | 0 |
| profile | | ... | ... |
| id | 139 | hasIssues | True |
| ... | ... | detectedIssues | [Optical Signal Level dimmer than $T_{rec}$; Receive Level at OLT dimmer than $T_{rec}$] |

Fig. 3F

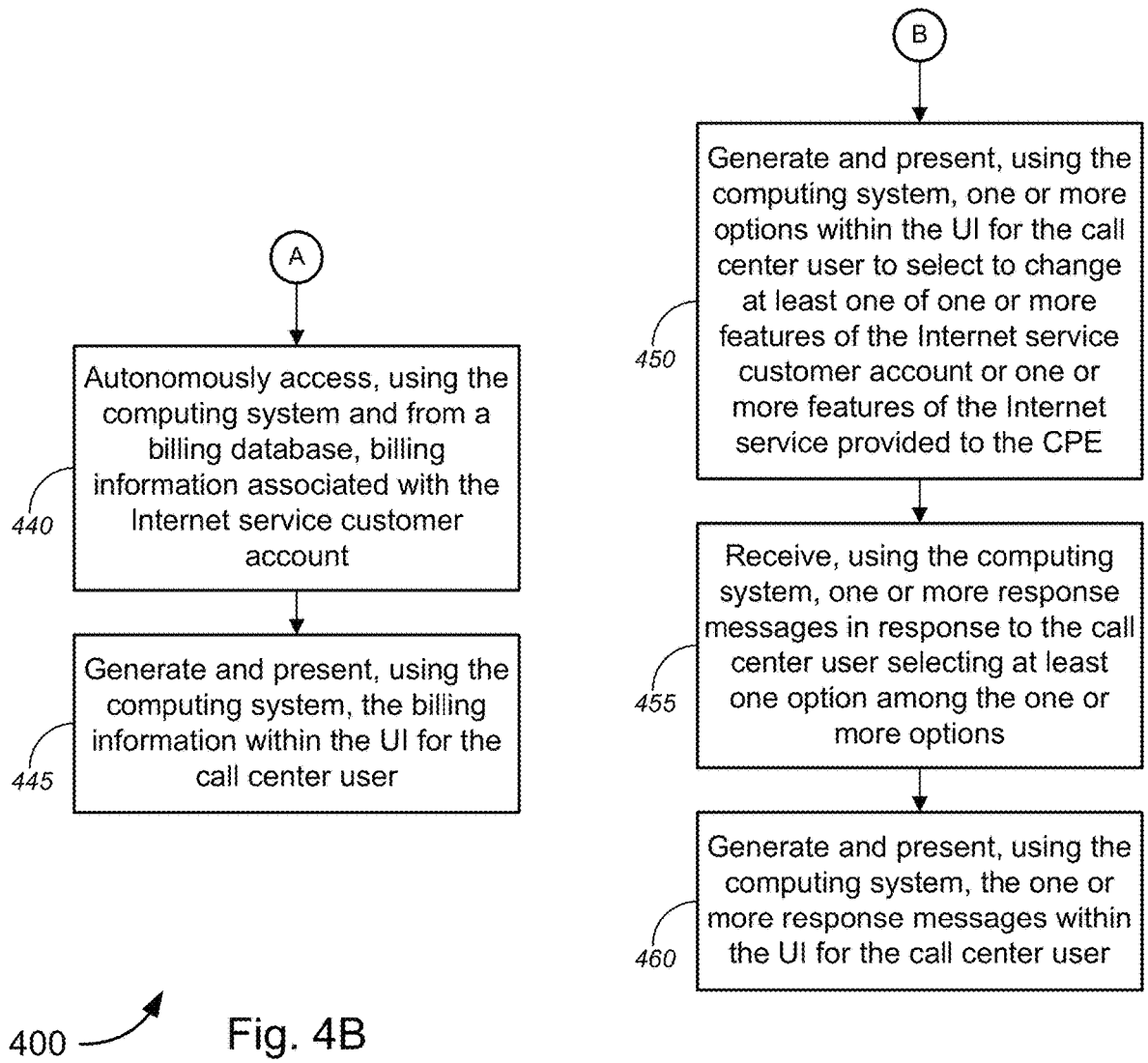

PROVISIONING TOOL—CALL CENTER-BASED AUTOMATED INTERFACE WITH NETWORK SWITCHES FOR INTERNET SERVICE DIAGNOSTICS AND PROVISIONING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing Internet service diagnostics and provisioning, and, more particularly, to methods, systems, and apparatuses for implementing call center-based automated interface with network switches for Internet service diagnostics and provisioning (also referred to herein as "Provisioning Tool").

BACKGROUND

Conventional call centers (especially ones that support Internet services, or the like) typically do not provide call center agents with the ability to see all aspects of services provided to a customer, much less provide such agents with the ability to fix mal-functioning or non-functioning features of such services. For instance, conventional call center systems have no direct access to billing systems, and thus do not provide call center agents with billing information without significant (and at times, time consuming) effort on the part of the agents. Further, conventional call center systems do not have access to the network switches providing the Internet services (e.g., digital subscriber line access multiplexers ("DSLAMs"), optical line terminals ("OLTs"), etc.). In most cases, conventional call center agents must initiate a truck roll to dispatch field technicians to the customer premises, or the affected network switches, or the like. Moreover, as there are no established systems and processes in place in conventional call centers, response to customer calls for help may differ from call center agent to call center agent, resulting in inconsistent (and in some cases, ineffectual) results and responses to the customer issues.

Hence, there is a need for more robust and scalable solutions for implementing Internet service diagnostics and provisioning, and, more particularly, to methods, systems, and apparatuses for implementing call center-based automated interface with network switches for Internet service diagnostics and provisioning.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3F are schematic diagrams illustrating various non-limiting examples of user interfaces ("UIs") may be used when implementing call center-based automated interface with network switches for Internet service diagnostics and provisioning, in accordance with various embodiments.

FIGS. 4A-4F are flow diagrams illustrating a method for implementing call center-based automated interface with network switches for Internet service diagnostics and provisioning, in accordance with various embodiments.

DETAILED DESCRIPTION OF CERTAIN EMBODIMENTS

Overview

Figure 1:
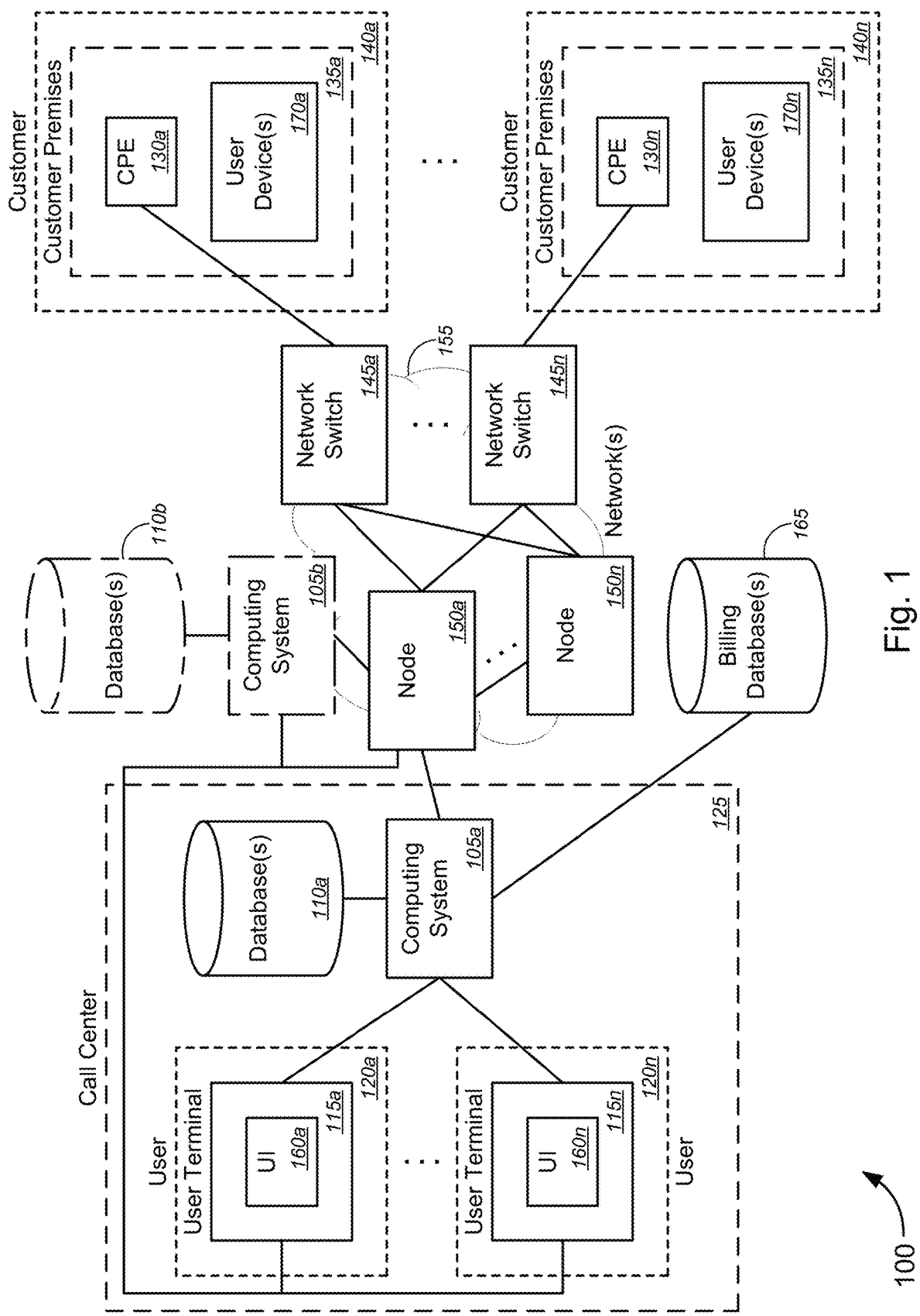
FIG. 1 is a schematic diagram illustrating a system for implementing call center-based automated interface with network switches for Internet service diagnostics and provisioning, in accordance with various embodiments.

Various embodiments provide tools and techniques for implementing Internet service diagnostics and provisioning, and, more particularly, to methods, systems, and apparatuses for implementing call center-based automated interface with network switches for Internet service diagnostics and provisioning.

In various embodiments, a computing system may receive a request by a call center user to access an Internet service customer account on behalf of a customer, the call center user being associated with the service provider that provides Internet service to a CPE disposed within customer premises associated with the customer. In response to receiving the request by the call center user to access the Internet service customer account on behalf of the customer, the computing system may access information regarding the Internet service customer account and regarding an Internet profile associated with the Internet service customer account that are stored in a database. The computing system may identify at least one network switch among a plurality of network switches in a network that is configured to provide Internet service to the CPE associated with the customer, based at least in part on the accessed information.

The computing system may autonomously access the identified at least one network switch and may diagnose the Internet service provided to the CPE via the identified at least one network switch. In some embodiments, diagnosing the Internet service may include, without limitation, determining whether the CPE has an Internet Protocol ("IP") address. Based on a determination that the CPE does not have an IP address, the computing system may autonomously access one or more other CPEs communicatively coupled to the identified at least one network switch, and may determine whether each of the one or more other CPEs has an IP address. Based on a determination that the CPE does not have an IP address but the one or more other CPEs have IP addresses, the computing system may initiate one or more first diagnosis and repair procedures on the CPE, and may generate a first message indicating information regarding potential issues with the CPE and indicating that the one or more first diagnosis and repair procedures have been initiated on the CPE. Based on a determination that the CPE and at least one other CPE among the one or more other CPEs do not have IP addresses, the computing system may initiate one or more second diagnosis and repair procedures on one or more of the identified at least one network switch or an aggregator node serving the identified at least one network switch, and may generate a second message indicating information regarding potential issues with the one or more of the identified at least one network switch or the aggregator node and indicating that the one or more second diagnosis and repair procedures have been initiated on the one or more of the identified at least one network switch or the aggregator node. The computing system may generate and present a user interface ("UI") presented on corresponding user terminal among the plurality of user terminals displaying at least one of the accessed information regarding the Internet service customer account, the accessed information regarding the Internet profile, the first message, or the second message, and/or the like.

In some embodiments, the UI may be generated and presented via a web portal to which the call center user is logged in. In some cases, accessing the information regarding the Internet service customer account and regarding the Internet profile that are stored in the database may comprise accessing the database via a first application programming interface ("API") between the computing system and the database. Likewise, autonomously accessing the identified at least one network switch may comprise autonomously accessing the identified at least one network switch via a second API between the computing system and each of the identified at least one network switch. Similarly, autonomously accessing the one or more other CPEs communicatively coupled to the identified at least one network switch may comprise autonomously accessing the one or more other CPEs communicatively coupled to the identified at least one network switch via one or more third APIs between the computing system and the one or more other CPEs. In some instances, initiating the one or more second diagnosis and repair procedures may comprise initiating the one or more second diagnosis and repair procedures on the aggregator node serving the identified at least one network switch. In some cases, initiating the one or more second diagnosis and repair procedures on the aggregator node may comprise autonomously accessing the aggregator node via a fourth API between the computing system and the aggregator node.

In some embodiments, diagnosing Internet service provided to the CPE via the identified at least one network switch may further include, without limitation, at least one of: determining whether there is intermittent connection between the CPE and one or more of the identified at least one network switch, the aggregator node, or an Internet router based on current or historical diagnosis; determining whether there is a Layer 3 traffic issue in which there is no IP address due to the network not being recognized; determining whether there is a no browse issue in which there is an IP address but no connection; or determining whether Internet speed or Internet bandwidth is reduced compared with subscribed Internet speed or Internet bandwidth beyond a threshold amount; and/or the like.

In the various embodiments, the call center-based automated interface with network switches for Internet service diagnostics and provisioning may provide a uniform access to most, if not all, aspects of the Internet service provided to the customer and/or the Internet service customer account, and to integrate all accessed information within a UI presented and displayed to the call service user or agent. In some cases, the call center-based automated interface may autonomously access the respective databases and/or may autonomously access a network switch(es) associated with the Internet service. Alternatively, or additionally, the call center-based automated interface may provide options for the call service user or agent to affect changes to the Internet service provided to the customer and/or the Internet service customer account. As such, in most cases, truck rolls (i.e., dispatching field technicians, etc.) may be avoided, while quickly and efficiently addressing customer issues, resulting in better service to the customer and greater customer satisfaction. In some cases, the system consolidates error and corresponding actions into a single selectable action (i.e., in a master fix option, or the like) that simplifies the process of diagnostics and provisioning from the perspective of the call service user, while avoiding potential for a mistake by the call service user to negatively affect the Internet service provided to not only the customer being helped but also to surrounding customers.

These and other aspects of the call center-based automated interface with network switches for Internet service diagnostics and provisioning are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, network diagnostics technology, network provisioning technology, network diagnostics and provisioning technology, network service management technology, call center technology, and/or the like. In other aspects, certain embodiments, can improve the functioning of user equipment or systems themselves (e.g., network diagnostics system, network provisioning system, network diagnostics and provisioning system, network service management system, call center system, etc.), for example, by, in response to receiving a request by a call center user to access an Internet service customer account on behalf of a customer, accessing, using a computing system, information regarding the Internet service customer account and regarding an Internet profile associated with the Internet service customer account that are stored in a database, the call center user being associated with a service provider that provides Internet service to customer premises equipment ("CPE") disposed within customer premises associated with the customer; identifying, using the computing system, at least one network switch among a plurality of network switches in a network that is configured to provide Internet service to the CPE associated with the customer, based at least in part on the accessed information; autonomously accessing, using the computing system, the identified at least one network switch, and diagnosing, using the computing system, the Internet service provided to the CPE via the identified at least one network switch, wherein diagnosing the Internet service may comprise determining whether the CPE has an Internet Protocol ("IP") address; based on a determination that the CPE does not have an IP address, autonomously accessing, using the computing system, one or more other CPEs communicatively coupled to the identified at least one network switch, and determining whether each of the one or more other CPEs has an IP address; based on a determination that the CPE does not have an IP address but the one or more other CPEs have IP addresses, initiating, using the computing system, one or more first diagnosis and repair procedures on the CPE, and generating, using the computing system, a first message indicating information regarding potential issues with the CPE and indicating that the one or more first diagnosis and repair procedures have been initiated on the CPE; based on a determination that the CPE and at least one other CPE among the one or more other CPEs do not have IP addresses, initiating, using the computing system, one or more second diagnosis and repair procedures on one or more of the identified at least one network switch or an aggregator node serving the identified at least one network switch, and generating, using the computing system, a second message indicating information regarding potential issues with the one or more of the identified at least one network switch or the aggregator node and indicating that the one or more second diagnosis and repair procedures have been initiated on the one or more of the identified at least one network switch or the aggregator node; and generating and presenting, using the computing system, a user interface ("UI") displaying at least one of the accessed information regarding the Internet service customer account, the accessed information regarding the Internet profile, the first message, or the second message; and/or the like.

In particular, to the extent any abstract concepts are present in the various embodiments, those concepts can be implemented as described herein by devices, software, systems, and methods that involve specific novel functionality (e.g., steps or operations), such as, the call center-based automated interface with network switches for Internet service diagnostics and provisioning providing a uniform access to most, if not all, aspects of the Internet service provided to the customer and/or the Internet service customer account, and to integrate all accessed information within a UI presented and displayed to the call service user or agent; autonomously accessing the respective databases and/or a switch(es) associated with the Internet service; and/or providing options for the call service user or agent to affect changes to the Internet service provided to the customer and/or the Internet service customer account. These functionalities can produce tangible results outside of the implementing computer system, including, merely by way of example, optimized response to customer calls for help with their Internet services and/or accounts, in most cases, obviating truck rolls (i.e., dispatching field technicians, etc.), while quickly and efficiently addressing customer issues, resulting in better service to the customer and greater customer satisfaction, and/or the like, to name a few examples, that extend beyond mere conventional computer processing operations, and/or the like, at least some of which may be observed or measured by customers and/or service providers.

In an aspect, a method may comprise, in response to receiving a request by a call center user to access an Internet service customer account on behalf of a customer, accessing, using a computing system, information regarding the Internet service customer account and regarding an Internet profile associated with the Internet service customer account that are stored in a database, the call center user being associated with a service provider that provides Internet service to customer premises equipment ("CPE") disposed within customer premises associated with the customer. The method may further comprise identifying, using the computing system, at least one network switch among a plurality of network switches in a network that is configured to provide Internet service to the CPE associated with the customer, based at least in part on the accessed information; and autonomously accessing, using the computing system, the identified at least one network switch, and diagnosing, using the computing system, the Internet service provided to the CPE via the identified at least one network switch, wherein diagnosing the Internet service may comprise determining whether the CPE has an Internet Protocol ("IP") address. The method may also comprise, based on a determination that the CPE does not have an IP address, autonomously accessing, using the computing system, one or more other CPEs communicatively coupled to the identified at least one network switch, and determining whether each of the one or more other CPEs has an IP address; based on a determination that the CPE does not have an IP address but the one or more other CPEs have IP addresses, initiating, using the computing system, one or more first diagnosis and repair procedures on the CPE, and generating, using the computing system, a first message indicating information regarding potential issues with the CPE and indicating that the one or more first diagnosis and repair procedures have been initiated on the CPE; and based on a determination that the CPE and at least one other CPE among the one or more other CPEs do not have IP addresses, initiating, using the computing system, one or more second diagnosis and repair procedures on one or more of the identified at least one network switch or an aggregator node serving the identified at least one network switch, and generating, using the computing system, a second message indicating information regarding potential issues with the one or more of the identified at least one network switch or the aggregator node and indicating that the one or more second diagnosis and repair procedures have been initiated on the one or more of the identified at least one network switch or the aggregator node. The method may further comprise generating and presenting, using the computing system, a user interface ("UI") displaying at least one of the accessed information regarding the Internet service customer account, the accessed information regarding the Internet profile, the first message, or the second message, and/or the like.

In some embodiments, the computing system may comprise at least one of a network diagnostics computing system, a network provisioning computing system, a network service management computing system, a call center computing system, a server computer, a webserver, a cloud computing system, or a distributed computing system, and/or the like. In some cases, the Internet service may comprise at least one of Internet service via digital subscriber line ("DSL")-based technologies ("xDSL"), Internet service via coaxial cable-based technologies, Internet service via fiber optics-based technologies, or Internet service via copper wire-based technologies, and/or the like.

According to some embodiments, the identified at least one network switch may comprise a digital subscriber line access multiplexers ("DSLAM") among a plurality of DSLAMs in the network, and the CPE may comprise a DSL-based modulator-demodulator ("modem"). In such cases, at least one of the one or more first repair procedures and the one or more second repair procedures may comprise at least one of: remote, network-based diagnostics and repair, initiated by the computing system, of the DSL-based modem, wherein the remote, network-based diagnostics and repair of the DSL-based modem may comprise at least one of remote restarting or rebooting, remote reconfiguration, remote software updating, or remote port bouncing of the DSL-based modem, and/or the like; remote, network-based metallic line diagnostics and repair, initiated by the computing system, of copper lines between the identified DSLAM and the customer premises associated with the customer; remote, network-based switch level diagnostics and repair, initiated by the computing system, of the identified DSLAM, wherein the remote, network-based diagnostics and repair of the identified DSLAM may comprise at least one of remote restarting or rebooting, remote reconfiguration, remote software updating, or remote port bouncing of the identified DSLAM, and/or the like; or remote, network-based diagnostics and repair, initiated by the computing system, of one or more nodes in the network that are communicatively coupled with the identified DSLAM, wherein the remote, network-based diagnostics and repair of the identified DSLAM may comprise at least one of remote restarting or rebooting, remote reconfiguration, remote software updating, or remote port bouncing of the one or more nodes, and/or the like, wherein the one or more nodes may comprise at least one of one or more broadband remote access servers ("BRAS"), one or more aggregator nodes, or one or more Internet nodes, and/or the like; and/or the like.

Alternatively, the identified at least one network switch may comprise an optical line terminal ("OLT") among a plurality of OLTs in the network, and the CPE may comprise an optical network unit ("ONU") or an optical network terminal ("ONT"). In such cases, at least one of the one or more first repair procedures and the one or more second repair procedures may comprise at least one of: remote, network-based diagnostics and repair, initiated by the computing system, of the ONU or ONT, wherein the remote, network-based diagnostics and repair of the ONU or ONT may comprise at least one of remote restarting or rebooting, remote reconfiguration, remote software updating, or remote port bouncing of the ONU or ONT, and/or the like; remote, network-based metallic line diagnostics and repair, initiated by the computing system, of optical fiber lines between the OLT and the customer premises associated with the customer; remote, network-based switch level diagnostics and repair, initiated by the computing system, of the OLT, wherein the remote, network-based diagnostics and repair of the OLT may comprise at least one of remote restarting or rebooting, remote reconfiguration, remote software updating, or remote port bouncing of the OLT, and/or the like; or remote, network-based diagnostics and repair, initiated by the computing system, of one or more nodes in the network that are communicatively coupled with the OLT, wherein the remote, network-based diagnostics and repair of the OLT may comprise at least one of remote restarting or rebooting, remote reconfiguration, remote software updating, or remote port bouncing of the one or more nodes, and/or the like, wherein the one or more nodes may comprise at least one of one or more core switches, one or more aggregator nodes, or one or more Internet nodes, and/or the like; and/or the like.

In some embodiments, the UI may be generated and presented via a web portal to which the call center user is logged in. In some cases, accessing the information regarding the Internet service customer account and regarding the Internet profile that are stored in the database may comprise accessing the database via a first application programming interface ("API") between the computing system and the database. Likewise, autonomously accessing the identified at least one network switch may comprise autonomously accessing the identified at least one network switch via a second API between the computing system and each of the identified at least one network switch. Similarly, autonomously accessing the one or more other CPEs communicatively coupled to the identified at least one network switch may comprise autonomously accessing, using the computing system, the one or more other CPEs communicatively coupled to the identified at least one network switch via one or more third APIs between the computing system and the one or more other CPEs. In some instances, initiating the one or more second diagnosis and repair procedures may comprise initiating, using the computing system, the one or more second diagnosis and repair procedures on the aggregator node serving the identified at least one network switch. In some cases, initiating the one or more second diagnosis and repair procedures on the aggregator node may comprise autonomously accessing the aggregator node via a fourth API between the computing system and the aggregator node.

According to some embodiments, the method may further comprise, based on a determination that the CPE does have an IP address and based on a determination that measured Internet speed or Internet bandwidth does not match subscribed Internet speed or Internet bandwidth within a predetermined threshold amount, autonomously accessing and diagnosing successively, using the computing system, each of the CPE, the at least one network switch, the one or more other CPEs communicatively coupled to the identified at least one network switch, the aggregator node, or an Internet router until a source of discrepancy in Internet speed or Internet bandwidth is found among these components; and based on a determination that one of the CPE, the at least one network switch, the aggregator node, or the Internet router is determined to be the source of discrepancy in Internet speed or Internet bandwidth, initiating, using the computing system, one or more third diagnosis and repair procedures on the one of the CPE, the at least one network switch, the aggregator node, or the Internet router, and generating, using the computing system, a third message indicating that the one or more third diagnosis and repair procedures have been initiated on the one of the CPE, the at least one network switch, the aggregator node, or the Internet router to address the discrepancy in Internet speed or Internet bandwidth.

In some instances, each of initiating the one or more first diagnosis and repair procedures, initiating the one or more second diagnosis and repair procedures, or initiating the one or more third diagnosis and repair procedures may comprise one of: autonomously initiating, using the computing system, respective one of the one or more first diagnosis and repair procedures, the one or more second diagnosis and repair procedures, or the one or more third diagnosis and repair procedures; or initiating, using the computing system, respective one of the one or more first diagnosis and repair procedures, the one or more second diagnosis and repair procedures, or the one or more third diagnosis and repair procedures in response to receiving a selection, by the call center user, of a master fix option that is generated and displayed within the UI, the master fix option encapsulating consolidation of a plurality of issues diagnosed by the computing system and corresponding repair procedures within a single repair option without distillation into separate repair options for each diagnosed issue.

In some embodiments, diagnosing Internet service provided to the CPE via the identified at least one network switch may further comprise at least one of: determining whether there is intermittent connection between the CPE and one or more of the identified at least one network switch, the aggregator node, or an Internet router based on current or historical diagnosis; determining whether there is a Layer 3 traffic issue in which there is no IP address due to the network not being recognized; determining whether there is a no browse issue in which there is an IP address but no connection; or determining whether Internet speed or Internet bandwidth is reduced compared with subscribed Internet speed or Internet bandwidth beyond a threshold amount; and/or the like.

According to some embodiments, the method may further comprise, based on a determination that the CPE does not have an IP address but the one or more other CPEs have IP addresses, determining, using the computing system, whether the lack of IP address can be addressed by at least one of: the CPE being powered on or rebooted; changing or updating configuration settings on the CPE; or fixing any issues with one or more Internet communication lines within the customer premises; and/or the like. Alternatively, the method may further comprise, based on a determination that the CPE does not have an IP address and at least one other CPE among the one or more other CPEs do not have IP addresses, determining, using the computing system, whether the lack of IP address can be addressed by at least one of: fixing the identified at least one network switch that is determined to be offline or non-functional; changing or updating configuration settings on the identified at least one network switch; or fixing any partial or complete cuts in one or more Internet communication lines between the identified at least one network switch and the CPE; and/or the like. Alternatively, the method may further comprise, based on a determination that there is intermittent connection between the CPE and one or more of the identified at least one network switch, the aggregator node, or the Internet router, determining, using the computing system, whether the intermittent connection can be addressed by at least one of: the CPE being powered on or rebooted; fixing any errors building on one or more Internet communication lines between the CPE and the one or more of the identified at least one network switch, the aggregator node, or the Internet router; or fixing any partial or complete cuts in one or more Internet communication lines between the CPE and the one or more of the identified at least one network switch, the aggregator node, or the Internet router; and/or the like.

Alternatively, the method may further comprise, based on a determination that there is a Layer 3 traffic issue in which there is no IP address due to the network not being recognized, determining, using the computing system, whether the Layer 3 traffic issue can be addressed by at least one of: fixing any potential sources of the Layer 3 traffic issue in the identified at least one network switch; fixing any potential sources of the Layer 3 traffic issue in the aggregator node; or fixing any potential sources of the Layer 3 traffic issue in the Internet router; and/or the like. Alternatively, the method may further comprise, based on a determination that there is a no browse issue in which there is an IP address but no connection, determining, using the computing system, whether the no browse issue can be addressed by at least one of: rebuilding the Internet profile associated with the Internet service customer account; bouncing one or more ports of the identified at least one network switch; or causing the CPE to request a new IP address; and/or the like. Alternatively, the method may further comprise, based on a determination that Internet speed or Internet bandwidth is reduced compared with subscribed Internet speed or Internet bandwidth beyond a threshold amount, determining, using the computing system, whether the reduced Internet speed or Internet bandwidth can be addressed by at least one of: changing, updating, or correcting the Internet profile associated with the Internet service customer account; changing or updating configuration settings in the CPE; changing or updating configuration settings in the identified at least one network switch; changing or updating configuration settings in the aggregator node; replacing the CPE; or rerouting network traffic through one or more other nodes in the network; and/or the like.

In some embodiments, the method may further comprise initiating the additional repair procedures comprising at least one of: dispatching a technician associated with the service provider to perform on-site repair procedures at the customer premises; dispatching a technician associated with the service provider to perform on-site repair procedures at the at least one network switch; or dispatching a technician associated with the service provider to perform on-site repair procedures at a physical location at which one or more nodes of the network are disposed; and/or the like.

Merely by way of example, in some cases, the accessed information regarding the Internet service customer account may comprise at least one of: billing information associated with the Internet service customer account; customer line information associated with the Internet service customer account; line-specific information associated with the Internet service provided to the customer; network profile information associated with the Internet service provided to the customer; identification information of each of the at least one network switch; switch information for each of the at least one network switch; information regarding one or more features of the Internet service provided to the customer; information regarding any requested buried service wire ("BSW") tickets; or information regarding manual switch access for each of the at least one network switch; and/or the like.

According to some embodiments, the method may further comprise autonomously accessing, using the computing system and from a billing database, billing information associated with the Internet service customer account; and generating and presenting, using the computing system, the billing information within the UI for the call center user.

In some embodiments, the method may further comprise generating and presenting, using the computing system, one or more options within the UI for the call center user to select to change at least one of one or more features of the Internet service customer account or one or more features of the Internet service provided to the CPE, and/or the like; receiving, using the computing system, one or more response messages in response to the call center user selecting at least one option among the one or more options; and generating and presenting, using the computing system, the one or more response messages within the UI for the call center user.

In some instances, the one or more response messages may comprise at least one of: a message indicating success; a message indicating no network inventory records found; a message indicating an application programming interface ("API") error; a message indicating an unsupported device with respect to the identified at least one network switch; a message indicating that the Internet service associated with the customer has been authenticated in response to a check authentication option; a message indicating that the Internet service associated with the customer has been authenticated and indicating without outage; a message indicating that the Internet service associated with the customer has been authenticated and indicating with ping failure but without outage; a message indicating that the Internet service associated with the customer has not been authenticated in response to a check authentication option; a message indicating that the Internet service associated with the customer has not been authenticated and indicating without outage; a message indicating that the Internet service associated with the customer has not been authenticated and indicating existing outage; a message indicating that the Internet service associated with the customer has not been authenticated and indicating emerging outage; a message indicating that there are no active broadband services; a message indicating that no high speed Internet ("HSI") assignment record has been found; a message indicating a missing required parameter; a message indicating success in response to selecting a check aggregator option; a message indicating success and indicating true html format in response to selecting a check aggregator option; a message indicating invalid aggregator type; a message indicating successful test result with no issues in response to selecting a metallic line test ("MLT") option; a message indicating successful test result with ring to ground low resistance issues detected in response to selecting a MLT option; a message indicating successful test result multiple issues detected in response to selecting a MLT option; a message indicating that a device is not configured for MLT; a message indicating that metallic line testing is not available for a device type; a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues, and/or the like; a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues, and/or the like; a message indicating virtual cross connect ("VCC") data comprising at least one of whether one or more cross connect issues have been detected, or details regarding any detected cross connect issues, and/or the like; a message indicating successful rebuild of network switch provisioning; a message indicating a missing nonce error; a message indicating an invalid nonce error; a message indicating success pertaining to clearing of IP leases to release IP addresses for use by other devices; a message indicating an error pertaining to a missing required parameter; or a message indicating an error pertaining to an unsupported device; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: in response to receiving a request by a call center user to access an Internet service customer account on behalf of a customer, access information regarding the Internet service customer account and regarding an Internet profile associated with the Internet service customer account that are stored in a database, the call center user being associated with a service provider that provides Internet service to customer premises equipment ("CPE") disposed within customer premises associated with the customer; identify at least one network switch among a plurality of network switches in a network that is configured to provide Internet service to the CPE associated with the customer, based at least in part on the accessed information; autonomously access the identified at least one network switch, and diagnose the Internet service provided to the CPE via the identified at least one network switch, wherein diagnosing the Internet service may comprise determining whether the CPE has an Internet Protocol ("IP") address; based on a determination that the CPE does not have an IP address, autonomously access one or more other CPEs communicatively coupled to the identified at least one network switch, and determine whether each of the one or more other CPEs has an IP address; based on a determination that the CPE does not have an IP address but the one or more other CPEs have IP addresses, initiate one or more first diagnosis and repair procedures on the CPE, and generate a first message indicating information regarding potential issues with the CPE and indicating that the one or more first diagnosis and repair procedures have been initiated on the CPE; based on a determination that the CPE and at least one other CPE among the one or more other CPEs do not have IP addresses, initiate one or more second diagnosis and repair procedures on one or more of the identified at least one network switch or an aggregator node serving the identified at least one network switch, and generate a second message indicating information regarding potential issues with the one or more of the identified at least one network switch or the aggregator node and indicating that the one or more second diagnosis and repair procedures have been initiated on the one or more of the identified at least one network switch or the aggregator node; and generate and present a user interface ("UI") displaying at least one of the accessed information regarding the Internet service customer account, the accessed information regarding the Internet profile, the first message, or the second message, and/or the like.

In yet another aspect, a system might comprise a plurality of network switches in a network and a computing system. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: in response to receiving a request by a call center user to access an Internet service customer account on behalf of a customer, access information regarding the Internet service customer account and regarding an Internet profile associated with the Internet service customer account that are stored in a database, the call center user being associated with a service provider that provides Internet service to customer premises equipment ("CPE") disposed within customer premises associated with the customer; identify at least one network switch among the plurality of network switches in the network that is configured to provide Internet service to the customer premises associated with the customer, based at least in part on the accessed information; autonomously access the identified at least one network switch, and diagnose the Internet service provided to the CPE via the identified at least one network switch, wherein diagnosing the Internet service may comprise determining whether the CPE has an Internet Protocol ("IP") address; based on a determination that the CPE does not have an IP address, autonomously access one or more other CPEs communicatively coupled to the identified at least one network switch, and determine whether each of the one or more other CPEs has an IP address; based on a determination that the CPE does not have an IP address but the one or more other CPEs have IP addresses, initiate one or more first diagnosis and repair procedures on the CPE, and generate a first message indicating information regarding potential issues with the CPE and indicating that the one or more first diagnosis and repair procedures have been initiated on the CPE; based on a determination that the CPE and at least one other CPE among the one or more other CPEs do not have IP addresses, initiate one or more second diagnosis and repair procedures on one or more of the identified at least one network switch or an aggregator node serving the identified at least one network switch, and generate a second message indicating information regarding potential issues with the one or more of the identified at least one network switch or the aggregator node and indicating that the one or more second diagnosis and repair procedures have been initiated on the one or more of the identified at least one network switch or the aggregator node; and generate and present a user interface ("UI") displaying at least one of the accessed information regarding the Internet service customer account, the accessed information regarding the Internet profile, the first message, or the second message, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing Internet service diagnostics and provisioning, and, more particularly, to methods, systems, and apparatuses for implementing call center-based automated interface with network switches for Internet service diagnostics and provisioning, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing call center-based automated interface with network switches for Internet service diagnostics and provisioning, in accordance with various embodiments.

In the non-limiting embodiment of FIG. 1, system 100 might comprise a computing system 105a and a data store or database 110a that is local to the computing system 105a. In some cases, the database 110a might be external, yet communicatively coupled, to the computing system 105a. In other cases, the database 110a might be integrated within the computing system 105a. System 100 may further comprise one or more user terminals 115a-115n (collectively, "user terminals 115" or the like) that are operated by corresponding one or more users 120a-120n (collectively, "users 120" or the like). The computing system 105a and corresponding database(s) 110a, as well as the user terminals 115a-115n may be disposed at call center 125, which may be a facility in which a service provider assembles a number of users 120 (also referred to as, "call center agents," "agents," "customer service representatives," or "representatives," or the like"). Alternatively, or additionally, at least some of the user terminals 115 and users 120 may be networked together through the call center 125 (e.g., via virtual private networks ("VPNs"), or the like), without having to be physically present within the physical building(s) or campus(es) of the call center 125 (e.g., for telecommuting, teleworking, or remote working, etc.).

In some embodiments, system 100 may further comprise one or more customer premises equipment ("CPEs") 130a-130n (collectively, "CPEs 130" or the like) that are disposed at corresponding customer premises 135a-135n (collectively, "customer premises 135" or the like), each associated with a customer among a plurality of customers 140a-140n (collectively, "customers 140" or the like). System 100 may further comprise a plurality of network switches 145a-145n (collectively, "network switches 145" or the like) and a plurality of nodes 150a-150n (collectively, "nodes 150" or the like), both disposed within a network(s) 155 operated (and in some cases also owned) by the service provider. The nodes 150 and network switches 145 provide Internet service to the CPEs 130 that are disposed within corresponding customer premises 135 associated with corresponding customers 140. In some cases, the Internet service may comprise at least one of Internet service via digital subscriber line ("DSL")-based technologies ("xDSL"), Internet service via coaxial cable-based technologies, Internet service via fiber optics-based technologies, or Internet service via copper wire-based technologies, and/or the like.

According to some embodiments, the computing system 105a may include, without limitation, at least one of a network diagnostics computing system, a network provisioning computing system, a network service management computing system, or a call center computing system, and/or the like. Alternative or additional to the computing system 105a and corresponding database 110a being disposed within call center 125, system 100 might comprise remote computing system 105b and corresponding database(s) 110b that communicatively couple with the one or more user terminals 115a-115n at call center 125 via the network(s) 155 and via at least one node 150 (in this case, node 150a, or the like). In some embodiments, remote computing system 105b might comprise at least one of a server computer, a webserver, a cloud computing system, or a distributed computing system, and/or the like. In some cases, the user terminals 115 may each include, but is not limited to, at least one of a telephone, a headset, a desktop computer, a laptop computer, or a tablet computer, and/or the like. In some instances, the CPEs 130 might each include, without limitation, one of a DSL-based modulator-demodulator ("modem") for xDSL-based or copper wire-based Internet service, an optical network unit ("ONU") or an optical network terminal ("ONT") for fiber optics-based Internet service, or a cable modem for coaxial cable-based or copper wire-based Internet service, and/or the like. Other Internet services may include, but are not limited to, at least one of a frequency division vectoring service, a microwave radio service, a millimeter-wave radio service, a free-space optical service, a data over cable service interface specification ("DOCSIS")-based cable service, or a fixed backhaul wireless service, and/or the like. In some cases, customer premises 135, which might each include one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, network(s) 155 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 155 may include an access network of the service provider (e.g., an Internet service provider ("ISP")). In another embodiment, the network(s) 155 may include a core network of the service provider and/or the Internet. According to some embodiments, system 100 may further comprise one or more user devices 170a-170n (collectively, "user devices 170," or the like) that are disposed at corresponding customer premises 135a-135n associated with corresponding customers 140a-140n. The user devices 170 might each include, without limitation, one of a laptop computer, a tablet computer, a smart phone, a mobile phone, or a residential or office telephone, and/or the like.

In operation, computing system 105a and/or 105b (collectively, "computing system" or the like) may receive a request by a call center user (e.g., user 120, or the like) to access an Internet service customer account on behalf of a customer (e.g., customer 140a, or the like), the call center user being associated with the service provider that provides Internet service to a CPE disposed within customer premises associated with the customer (e.g., CPE 130a disposed within customer premises 135a associated with customer 140a, or the like). In response to receiving the request by the call center user to access the Internet service customer account on behalf of the customer, the computing system may access information regarding the Internet service customer account and regarding an Internet profile associated with the Internet service customer account that are stored in a database (e.g., database(s) 110a and/or 110b, or the like). The computing system may identify at least one network switch (e.g., network switch 145a, or the like) among a plurality of network switches (e.g., network switches 145, or the like) in a network (e.g., network(s) 155) that is configured to provide Internet service to the CPE associated with the customer (e.g., customer 140a, or the like), based at least in part on the accessed information (i.e., information regarding the Internet service customer account and/or information regarding an Internet profile associated with the Internet service customer account, or the like).

The computing system may autonomously access the identified at least one network switch and may diagnose the Internet service provided to the CPE via the identified at least one network switch. In some embodiments, diagnosing the Internet service may include, without limitation, determining whether the CPE has an Internet Protocol ("IP") address. Based on a determination that the CPE does not have an IP address, the computing system may autonomously access one or more other CPEs communicatively coupled to the identified at least one network switch, and may determine whether each of the one or more other CPEs has an IP address. Based on a determination that the CPE does not have an IP address but the one or more other CPEs have IP addresses, the computing system may initiate one or more first diagnosis and repair procedures on the CPE, and may generate a first message indicating information regarding potential issues with the CPE and indicating that the one or more first diagnosis and repair procedures have been initiated on the CPE. Based on a determination that the CPE and at least one other CPE among the one or more other CPEs do not have IP addresses, the computing system may initiate one or more second diagnosis and repair procedures on one or more of the identified at least one network switch or an aggregator node serving the identified at least one network switch, and may generate a second message indicating information regarding potential issues with the one or more of the identified at least one network switch or the aggregator node and indicating that the one or more second diagnosis and repair procedures have been initiated on the one or more of the identified at least one network switch or the aggregator node. The computing system may generate and present a user interface ("UI"; e.g., a corresponding UI among UIs 160a-160n (collectively, "UIs 160" or the like) presented on corresponding user terminal among the plurality of user terminals (e.g., a user terminal among user terminals 115a-115n, or the like) displaying at least one of the accessed information regarding the Internet service customer account, the accessed information regarding the Internet profile, the first message, or the second message, and/or the like.

According to some embodiments, the identified at least one network switch may include a digital subscriber line access multiplexers ("DSLAM") among a plurality of DSLAMs in the network, and the CPE may include a DSL-based modem. In such cases, at least one of the one or more first repair procedures and the one or more second repair procedures may include, without limitation, at least one of: remote, network-based diagnostics and repair, initiated by the computing system, of the DSL-based modem; remote, network-based metallic line diagnostics and repair, initiated by the computing system, of copper lines between the identified DSLAM and the customer premises associated with the customer; remote, network-based switch level diagnostics and repair, initiated by the computing system, of the identified DSLAM; or remote, network-based diagnostics and repair, initiated by the computing system, of one or more nodes in the network that are communicatively coupled with the identified DSLAM; and/or the like.

In some instances, the remote, network-based diagnostics and repair of the DSL-based modem may include, but is not limited to, at least one of remote restarting or rebooting, remote reconfiguration, remote software updating, or remote port bouncing of the DSL-based modem, and/or the like. In some cases, the remote, network-based diagnostics and repair of the identified DSLAM may include, without limitation, at least one of remote restarting or rebooting, remote reconfiguration, remote software updating, or remote port bouncing of the identified DSLAM, and/or the like. In some instances, the remote, network-based diagnostics and repair of the identified DSLAM may include, but is not limited to, at least one of remote restarting or rebooting, remote reconfiguration, remote software updating, or remote port bouncing of the one or more nodes, and/or the like. In some cases, the one or more nodes (e.g., nodes 150, or the like) may include, but are not limited to, at least one of one or more broadband remote access servers ("BRAS"), one or more aggregator nodes, or one or more Internet nodes, and/or the like.

Alternatively, the identified at least one network switch may include an optical line terminal ("OLT") among a plurality of OLTs in the network, and the CPE may include an optical network unit ("ONU") or an optical network terminal ("ONT"). In such cases, at least one of the one or more first repair procedures and the one or more second repair procedures may include, without limitation, at least one of: remote, network-based diagnostics and repair, initiated by the computing system, of the ONU or ONT; remote, network-based metallic line diagnostics and repair, initiated by the computing system, of optical fiber lines between the OLT and the customer premises associated with the customer; remote, network-based switch level diagnostics and repair, initiated by the computing system, of the OLT; or remote, network-based diagnostics and repair, initiated by the computing system, of one or more nodes in the network that are communicatively coupled with the OLT; and/or the like.

In some instances, the remote, network-based diagnostics and repair of the ONU or ONT may include, but is not limited to, at least one of remote restarting or rebooting, remote reconfiguration, remote software updating, or remote port bouncing of the ONU or ONT, and/or the like. In some cases, the remote, network-based diagnostics and repair of the OLT may include, without limitation, at least one of remote restarting or rebooting, remote reconfiguration, remote software updating, or remote port bouncing of the OLT, and/or the like. In some instances, the remote, network-based diagnostics and repair of the OLT may include, but is not limited to, at least one of remote restarting or rebooting, remote reconfiguration, remote software updating, or remote port bouncing of the one or more nodes, and/or the like. In some cases, the one or more nodes may include, without limitation, at least one of one or more core switches, one or more aggregator nodes, or one or more Internet nodes, and/or the like.

In some embodiments, the UI may be generated and presented via a web portal to which the call center user is logged in. In some cases, accessing the information regarding the Internet service customer account and regarding the Internet profile that are stored in the database may comprise accessing the database via a first application programming interface ("API") between the computing system and the database. Likewise, autonomously accessing the identified at least one network switch may comprise autonomously accessing the identified at least one network switch via a second API between the computing system and each of the identified at least one network switch. Similarly, autonomously accessing the one or more other CPEs communicatively coupled to the identified at least one network switch may comprise autonomously accessing the one or more other CPEs communicatively coupled to the identified at least one network switch via one or more third APIs between the computing system and the one or more other CPEs. In some instances, initiating the one or more second diagnosis and repair procedures may comprise initiating the one or more second diagnosis and repair procedures on the aggregator node serving the identified at least one network switch. In some cases, initiating the one or more second diagnosis and repair procedures on the aggregator node may comprise autonomously accessing the aggregator node via a fourth API between the computing system and the aggregator node. The use of APIs is shown and described, for example, in the non-limiting examples of FIG. 2, or the like.

According to some embodiments, based on a determination that the CPE does have an IP address and based on a determination that measured Internet speed or Internet bandwidth does not match subscribed Internet speed or Internet bandwidth within a predetermined threshold amount, the computing system may autonomously access and diagnose successively (i.e., access and diagnose one then each of the others, in the following order) each of the CPE, the at least one network switch, the one or more other CPEs communicatively coupled to the identified at least one network switch, the aggregator node, or an Internet router until a source of discrepancy in Internet speed or Internet bandwidth is found among these components. Based on a determination that one of the CPE, the at least one network switch, the aggregator node, or the Internet router is determined to be the source of discrepancy in Internet speed or Internet bandwidth, the computing system may initiate one or more third diagnosis and repair procedures on the one of the CPE, the at least one network switch, the aggregator node, or the Internet router, and may generate a third message indicating that the one or more third diagnosis and repair procedures have been initiated on the one of the CPE, the at least one network switch, the aggregator node, or the Internet router to address the discrepancy in Internet speed or Internet bandwidth.

Figure 3D:
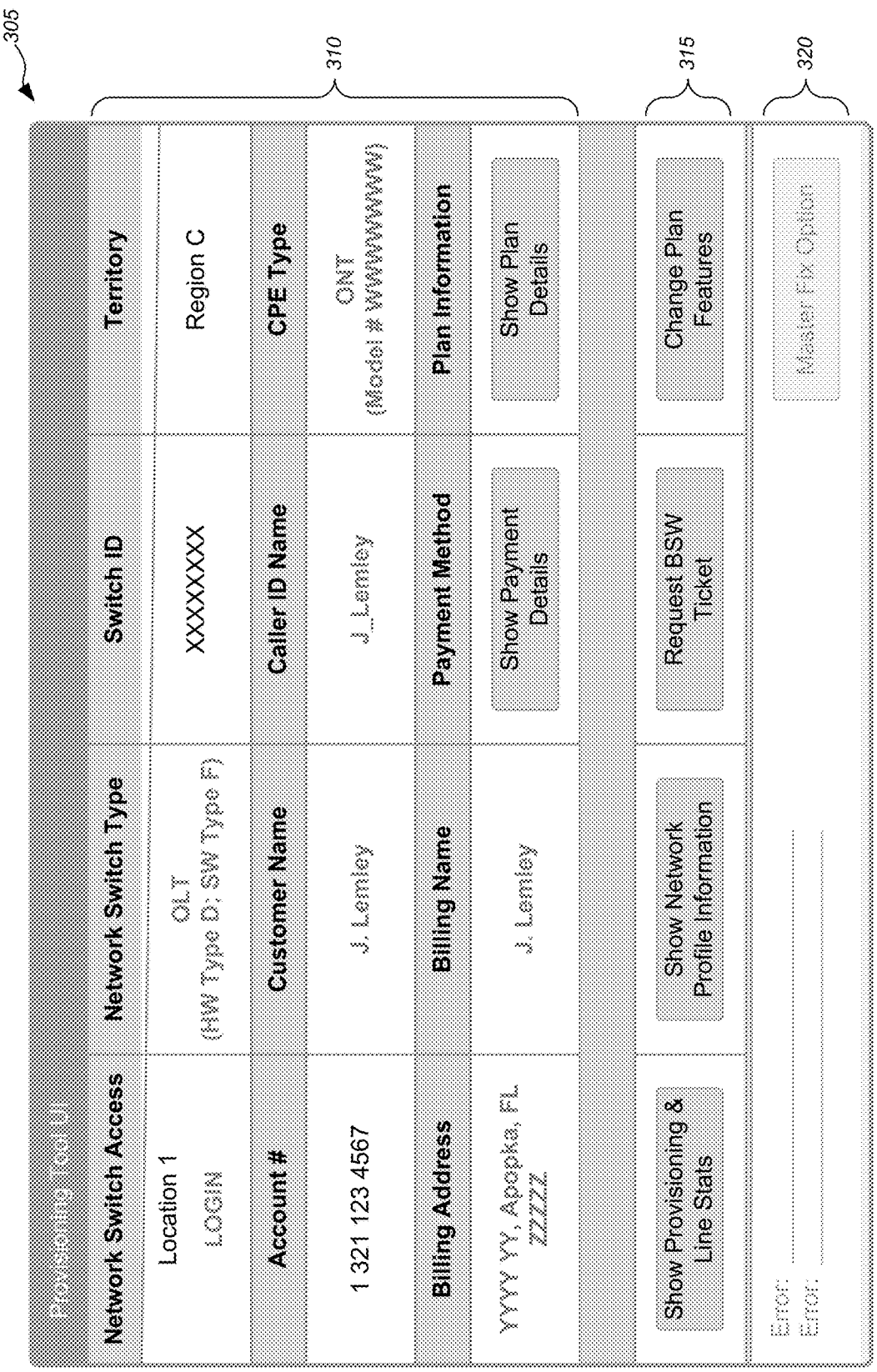

In some instances, each of initiating the one or more first diagnosis and repair procedures, initiating the one or more second diagnosis and repair procedures, or initiating the one or more third diagnosis and repair procedures may include, without limitation, one of: the computing system autonomously initiating respective one of the one or more first diagnosis and repair procedures, the one or more second diagnosis and repair procedures, or the one or more third diagnosis and repair procedures; or the computing system initiating respective one of the one or more first diagnosis and repair procedures, the one or more second diagnosis and repair procedures, or the one or more third diagnosis and repair procedures in response to receiving a selection, by the call center user, of a master fix option that is generated and displayed within the UI (e.g., as shown in FIGS. 3A and 3D, or the like), the master fix option encapsulating consolidation of a plurality of issues diagnosed by the computing system and corresponding repair procedures within a single repair option without distillation into separate repair options for each diagnosed issue.

In some embodiments, diagnosing Internet service provided to the CPE via the identified at least one network switch may further include, without limitation, at least one of: determining whether there is intermittent connection between the CPE and one or more of the identified at least one network switch, the aggregator node, or an Internet router based on current or historical diagnosis; determining whether there is a Layer 3 traffic issue in which there is no IP address due to the network not being recognized; determining whether there is a no browse issue in which there is an IP address but no connection; or determining whether Internet speed or Internet bandwidth is reduced compared with subscribed Internet speed or Internet bandwidth beyond a threshold amount; and/or the like.

According to some embodiments, based on a determination that the CPE does not have an IP address but the one or more other CPEs have IP addresses, the computing system may determine whether the lack of IP address can be addressed by at least one of: the CPE being powered on or rebooted; changing or updating configuration settings on the CPE; or fixing any issues with one or more Internet communication lines within the customer premises; and/or the like. Alternatively, based on a determination that the CPE does not have an IP address and at least one other CPE among the one or more other CPEs do not have IP addresses, the computing system may determine whether the lack of IP address can be addressed by at least one of: fixing the identified at least one network switch that is determined to be offline or non-functional; changing or updating configuration settings on the identified at least one network switch; or fixing any partial or complete cuts in one or more Internet communication lines between the identified at least one network switch and the CPE; and/or the like. Alternatively, based on a determination that there is intermittent connection between the CPE and one or more of the identified at least one network switch, the aggregator node, or the Internet router, the computing system may determine whether the intermittent connection can be addressed by at least one of: the CPE being powered on or rebooted; fixing any errors building on one or more Internet communication lines between the CPE and the one or more of the identified at least one network switch, the aggregator node, or the Internet router; or fixing any partial or complete cuts in one or more Internet communication lines between the CPE and the one or more of the identified at least one network switch, the aggregator node, or the Internet router; and/or the like.

Alternatively, based on a determination that there is a Layer 3 traffic issue in which there is no IP address due to the network not being recognized, the computing system may determine whether the Layer 3 traffic issue can be addressed by at least one of: fixing any potential sources of the Layer 3 traffic issue in the identified at least one network switch; fixing any potential sources of the Layer 3 traffic issue in the aggregator node; or fixing any potential sources of the Layer 3 traffic issue in the Internet router; and/or the like. Alternatively, based on a determination that there is a no browse issue in which there is an IP address but no connection, the computing system may determine whether the no browse issue can be addressed by at least one of: rebuilding the Internet profile associated with the Internet service customer account; bouncing one or more ports of the identified at least one network switch; or causing the CPE to request a new IP address; and/or the like. Alternatively, based on a determination that Internet speed or Internet bandwidth is reduced compared with subscribed Internet speed or Internet bandwidth beyond a threshold amount, the computing system may determine whether the reduced Internet speed or Internet bandwidth can be addressed by at least one of: changing, updating, or correcting the Internet profile associated with the Internet service customer account; changing or updating configuration settings in the CPE; changing or updating configuration settings in the identified at least one network switch; changing or updating configuration settings in the aggregator node; replacing the CPE; or rerouting network traffic through one or more other nodes in the network; and/or the like.

In some embodiments, the computing system may initiate the additional repair procedures including, but not limited to, at least one of: dispatching a technician associated with the service provider to perform on-site repair procedures at the customer premises; dispatching a technician associated with the service provider to perform on-site repair procedures at the at least one network switch; or dispatching a technician associated with the service provider to perform on-site repair procedures at a physical location at which one or more nodes of the network are disposed; and/or the like.

Merely by way of example, in some cases, the accessed information regarding the Internet service customer account may comprise at least one of: billing information associated with the Internet service customer account; customer line information associated with the Internet service customer account; line-specific information associated with the Internet service provided to the customer; network profile information associated with the Internet service provided to the customer; identification information of each of the at least one network switch; switch information for each of the at least one network switch; information regarding one or more features of the Internet service provided to the customer; information regarding any requested buried service wire ("BSW") tickets; or information regarding manual switch access for each of the at least one network switch; and/or the like.

According to some embodiments, the computing system may autonomously access, from a billing database (e.g., billing database 165, which may be communicatively coupled on at least one of computing system 105a and/or 105b, and may be disposed either at call center 125 and/or in network(s) 155, or the like), billing information associated with the Internet service customer account; and may generate and present the billing information within the UI for the call center user.

In some embodiments, the computing system may generate and present one or more options within the UI for the call center user to select to change at least one of one or more features of the Internet service customer account or one or more features of the Internet service provided to the CPE, and/or the like; may receive one or more response messages in response to the call center user selecting at least one option among the one or more options; and may generate and present the one or more response messages within the UI for the call center user.

In some instances, the one or more response messages may include, but are not limited to, at least one of: a message indicating success; a message indicating no network inventory records found; a message indicating an application programming interface ("API") error; a message indicating an unsupported device with respect to the identified at least one network switch; a message indicating that the Internet service associated with the customer has been authenticated in response to a check authentication option; a message indicating that the Internet service associated with the customer has been authenticated and indicating without outage; a message indicating that the Internet service associated with the customer has been authenticated and indicating with ping failure but without outage; a message indicating that the Internet service associated with the customer has not been authenticated in response to a check authentication option; a message indicating that the Internet service associated with the customer has not been authenticated and indicating without outage; a message indicating that the Internet service associated with the customer has not been authenticated and indicating existing outage; a message indicating that the Internet service associated with the customer has not been authenticated and indicating emerging outage; a message indicating that there are no active broadband services; a message indicating that no high speed Internet ("HSI") assignment record has been found; a message indicating a missing required parameter; a message indicating success in response to selecting a check aggregator option; a message indicating success and indicating true html format in response to selecting a check aggregator option; a message indicating invalid aggregator type; a message indicating successful test result with no issues in response to selecting a metallic line test ("MLT") option; a message indicating successful test result with ring to ground low resistance issues detected in response to selecting a MLT option; a message indicating successful test result multiple issues detected in response to selecting a MLT option; a message indicating that a device is not configured for MLT; a message indicating that metallic line testing is not available for a device type; a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues, and/or the like; a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues, and/or the like; a message indicating virtual cross connect ("VCC") data comprising at least one of whether one or more cross connect issues have been detected, or details regarding any detected cross connect issues, and/or the like; a message indicating successful rebuild of network switch provisioning; a message indicating a missing nonce error (where, herein, "nonce" refers to a one-time use token that is obtained when using a call for getting line information, that is consumed when using a call to change a feature, and that must be newly requested for additional provisioning checks, while "missing nonce error" refers to an error in nonce (e.g., token does not match, or the like)); a message indicating an invalid nonce error (where "invalid nonce error" refers to another error in nonce (e.g., a nonce token must be requested before performing a requested action, or the like)); a message indicating success pertaining to clearing of IP leases to release IP addresses for use by other devices; a message indicating an error pertaining to a missing required parameter; or a message indicating an error pertaining to an unsupported device; and/or the like.

These and other functions of the system 100 (and its components) are described in greater detail below with respect to FIGS. 2-4.

Figure 2:
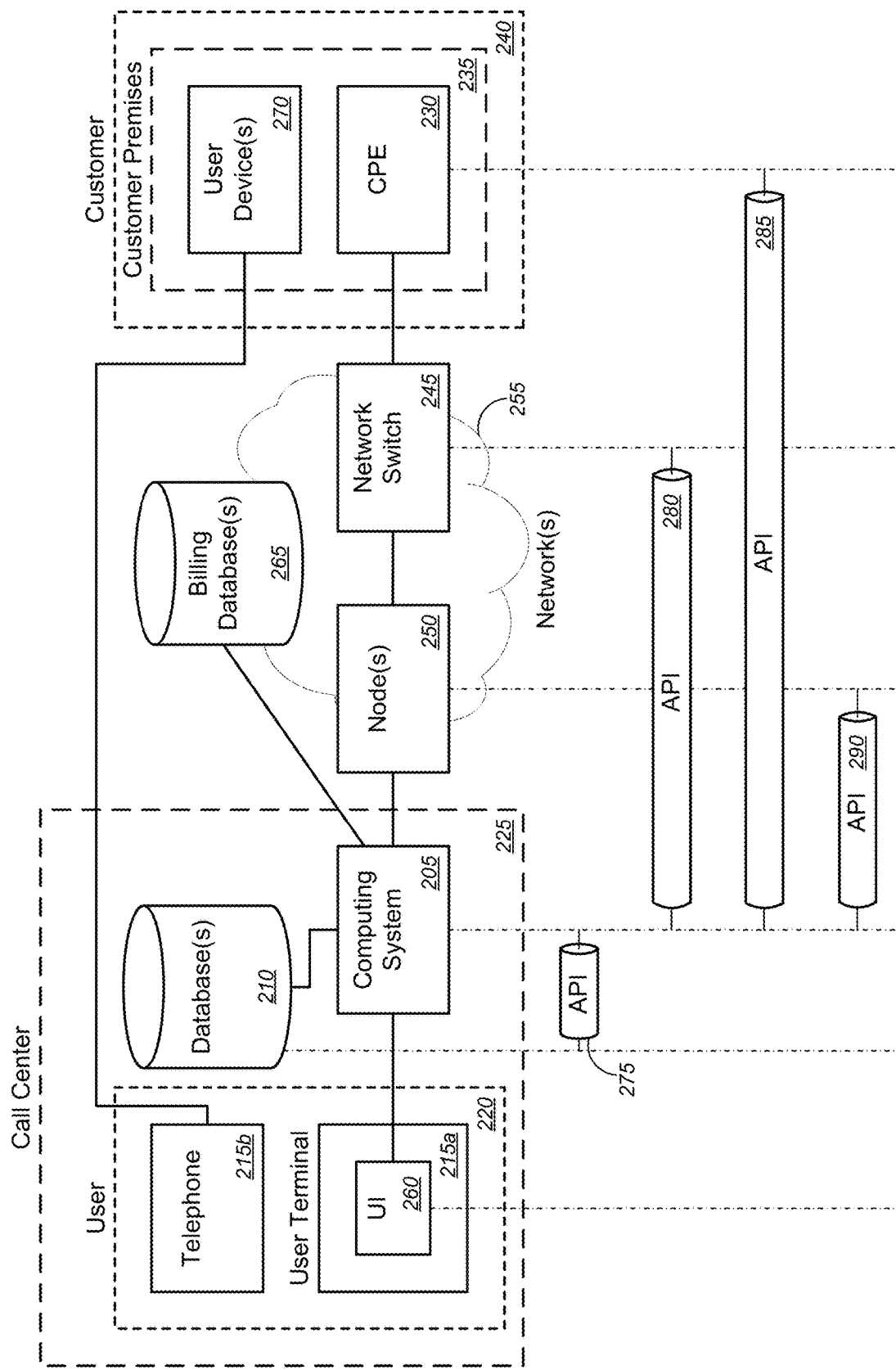
FIG. 2 is a schematic diagram illustrating a non-limiting example of use of application programming interfaces ("APIs") for implementing call center-based automated interface with network switches for Internet service diagnostics and provisioning, in accordance with various embodiments.

FIG. 2 is a schematic diagram illustrating a non-limiting example 200 of use of application programming interfaces ("APIs") for implementing call center-based automated interface with network switches for Internet service diagnostics and provisioning, in accordance with various embodiments.

With reference to the non-limiting example of FIG. 2, system 200 may comprise computing system 205 and corresponding database(s) 210, as well as user terminal 215a and telephone 215b associated with, or operated by, user 220. The computing system 205, database(s) 210, user terminal 215a, and telephone 215b may, in some cases, be disposed within call center 225 or accessed via call center 225. System 200 may further comprise CPE 230 and user device(s) 270 disposed within customer premises 235 associated with customer 240. System 200 may further comprise network switch 245 and node(s) 250 disposed within network(s) 255. UI 260 may be presented on user terminal 215a, while billing database(s) 265 may be accessible by computing system 205. The computing system 205, the database(s) 210, user terminal 215a (and telephone 215b), the user 220, the call center 225, the CPE 230, the user device(s) 270, the customer premises 235, the customer 240, the network switch 245, the node(s) 250, the network(s) 255, the UI 260, and the billing database(s) 265 of system 200 in FIG. 2 are otherwise similar, if not identical, to the computing system 105a and 105b, the database(s) 110a and 110b, user terminals 115a-115n, the users 120a-120n, the call center 125, the CPE 130a-130n, the user device(s) 170a-170n, the customer premises 135a-135n, the customers 140a-140n, the network switches 145a-145n, the node(s) 150a-150n, the network(s) 155, the UIs 160a-160n, and the billing database(s) 165, respectively, of system 100 in FIG. 1, and the descriptions of these components of system 100 are applicable to the corresponding components of system 200, respectively.

Further to the embodiments as described above with respect to FIG. 1, accessing the information regarding the Internet service customer account and regarding the Internet profile that are stored in the database may comprise accessing the database via a first application programming interface ("API") (e.g., API 275, or the like) between the computing system (e.g., computing system 205, or the like) and the database(s) (e.g., database(s) 210, or the like). Likewise, autonomously accessing the identified at least one network switch may comprise autonomously accessing the identified at least one network switch (e.g., switch 245, or the like) via a second API (e.g., API 280, or the like) between the computing system (e.g., computing system 205, or the like) and each of the identified at least one network switch (e.g., switch 245, or the like). Similarly, autonomously accessing the one or more other CPEs communicatively coupled to the identified at least one network switch may comprise autonomously accessing the one or more other CPEs communicatively coupled to the identified at least one network switch via one or more third APIs (e.g., APIs 285, or the like) between the computing system (e.g., computing system 205, or the like) and the one or more other CPEs. In some instances, initiating the one or more second diagnosis and repair procedures may comprise initiating the one or more second diagnosis and repair procedures on the aggregator node serving the identified at least one network switch. In some cases, initiating the one or more second diagnosis and repair procedures on the aggregator node may comprise autonomously accessing the aggregator node (e.g., node(s) 250, or the like) via a fourth API (e.g., API 290, or the like) between the computing system (e.g., computing system 205, or the like) and the aggregator node (e.g., node(s) 250, or the like).

FIGS. 3A-3F (collectively, "FIG. 3") are schematic diagrams illustrating various non-limiting examples 300 of user interfaces ("UIs") may be used when implementing call center-based automated interface with network switches for Internet service diagnostics and provisioning, in accordance with various embodiments. FIGS. 3A-3C are directed to call center UIs for Internet service via digital subscriber line ("DSL")-based Internet technologies (i.e., xDSL technologies, or the like), while FIGS. 3D-3F are directed to call center UIs for Internet service via optical fiber-based Internet technologies. In some cases, xDSL service may include, without limitation, a DSL service, an asymmetric DSL ("ADSL") service, a symmetric DSL ("SDSL") service, a high speed voice and data link service, a rate-adaptive DSL ("RADSL") service, or a very high bit rate DSL ("VDSL," "VDSL2," or "VDSL2-Vplus"), a uni-DSL ("UDSL") service, or the like), and/or the like. In some instances, optical fiber-based Internet service may include, but is not limited to, a passive optical network ("PON") service, a gigabit PON ("GPON") service, an Ethernet fiber line service, an Ethernet PON ("EPON") service, a next generation PON ("NGPON") service, or a second generation NGPON or 40 Gigabit-capable PON ("NGPON2") service, and/or the like.

Although FIG. 3 depicts call center UIs for Internet service via xDSL systems and via optical fiber-based systems, the various embodiments are not so limited, and the call center UIs may be used to provide information for Internet or broadband services using other Internet technologies, including but not limited to, at least one of a frequency division vectoring service, a microwave radio service, a millimeter-wave radio service, a free-space optical service, a data over cable service interface specification ("DOCSIS")-based cable service, or a fixed backhaul wireless service, and/or the like.

Referring to FIGS. 3A and 3D, a Provisioning Tool UI 305 may be generated or presented to a user (similar to users 120a-120n and/or 220 of FIGS. 1 and 2, or the like). In the non-limiting example of FIGS. 3A and 3D, the Provisioning Tool UI 305 may present information in data fields 310 and may present options 315. According to some embodiments, the data fields may include, without limitation, at least one of network switch access data field, network switch type data field, switch identification ("ID") data field, territory data field, account number data field, customer name data field, caller ID name data field, CPE type data field, billing address data field, billing name data field, payment method data field, or plan information data field, and/or the like. In some embodiments, the options 315 may include, but are not limited to, at least one of options to show provisioning and line statistics, options to show network profile information, options to request buried service wire ("BSW"), options to change plan features, and/or the like. According to some embodiments, the Provisioning Tool UI 305 may display any errors in error field(s) 320 together with a master fix option that encapsulates consolidation of a plurality of issues or errors that are diagnosed by the system and corresponding repair procedures within a single repair option without distillation into separate repair options for each diagnosed issue. In the case that there are errors (and these errors are listed in error field(s) 320), the error field(s) 320 and the master fix option may be displayed in full and may be accessible or selectable by the user (e.g., as shown in the non-limiting example of FIG. 3A). On the other hand, in the case that there are no errors, the error field(s) 320 and the master fix option may be displayed as grayed out fields that may be inaccessible or non-selectable by the user (e.g., as shown in the non-limiting example of FIG. 3D). In some cases, the UI 305 may include links for the user to select either to initiate other options or to edit data fields (as depicted in FIGS. 3A and 3D by bold-faced, gray-colored text). In some instances, the UI 305 may include UI virtual buttons to allow the user to request that details of information be shown (e.g., in a separate window (not shown) or in an expanded portion of the UI (not shown), or the like).

Although not shown in FIGS. 3A and 3D, other data fields or other data may include, without limitation, at least one of: other billing information associated with the Internet service customer account; customer line information associated with the Internet service customer account; line-specific information associated with the Internet service provided to the customer; network profile information associated with the Internet service provided to the customer; other switch information for each of the at least one network switch; information regarding one or more features of the Internet service provided to the customer; information regarding any requested BSW tickets; or information regarding manual switch access for each of the at least one network switch; and/or the like.

Also, although not shown in FIGS. 3A and 3D, the computing system may generate and present one or more response messages within the UI 305 for the call center user. In some instances, the one or more response messages may include, but are not limited to, at least one of: a message indicating success; a message indicating no network inventory records found; a message indicating an API error; a message indicating an unsupported device with respect to the identified at least one network switch; a message indicating that the Internet service associated with the customer has been authenticated in response to a check authentication option; a message indicating that the Internet service associated with the customer has been authenticated and indicating without outage; a message indicating that the Internet service associated with the customer has been authenticated and indicating with ping failure but without outage; a message indicating that the Internet service associated with the customer has not been authenticated in response to a check authentication option; a message indicating that the Internet service associated with the customer has not been authenticated and indicating without outage; a message indicating that the Internet service associated with the customer has not been authenticated and indicating existing outage; a message indicating that the Internet service associated with the customer has not been authenticated and indicating emerging outage; a message indicating that there are no active broadband services; a message indicating that no high speed Internet ("HSI") assignment record has been found; a message indicating a missing required parameter; a message indicating success in response to selecting a check aggregator option; a message indicating success and indicating true html format in response to selecting a check aggregator option; a message indicating invalid aggregator type; a message indicating successful test result with no issues in response to selecting a metallic line test ("MLT") option; a message indicating successful test result with ring to ground low resistance issues detected in response to selecting a MLT option; a message indicating successful test result multiple issues detected in response to selecting a MLT option; a message indicating that a device is not configured for MLT; a message indicating that metallic line testing is not available for a device type; a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues, and/or the like; a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues, and/or the like; a message indicating virtual cross connect ("VCC") data comprising at least one of whether one or more cross connect issues have been detected, or details regarding any detected cross connect issues, and/or the like; a message indicating successful rebuild of network switch provisioning; a message indicating a missing nonce error; a message indicating an invalid nonce error; a message indicating success pertaining to clearing of IP leases to release IP addresses for use by other devices; a message indicating an error pertaining to a missing required parameter; or a message indicating an error pertaining to an unsupported device; and/or the like.

Turning to FIGS. 3B and 3C, a UI 325 may be generated and presented to the user that displays provisioning and line statistics of the Internet service provided to the customer (e.g., in response to the user selecting the option or virtual button for showing provisioning and line statistics such as shown in FIG. 3A, or the like). As shown in the non-limiting embodiment of FIGS. 3B and 3C, for DSL-based Internet service, the UI 325 may display line parameters and statistics 330 (including normal line statistics 330a as shown in FIG. 3B and line statistics with errors 330b as shown in FIG. 3C) as well as port provisioning parameters and statistics 335 (including normal port provisioning statistics 335a shown in FIG. 3B and port provisioning statistics with errors 335b as shown in FIG. 3C). In some embodiments, the line parameters 330 may include, but are not limited to, at least one of the provisioned downstream data rate (in kbps), the provisioned upstream data rate (in kbps), the downstream sync rate (in kbps), the upstream sync rate (in kbps), the downstream signal to noise margin, the upstream signal to noise margin, the downstream attenuation value, the upstream attenuation value, whether a port is in sync (with a Boolean True if the port has sync or False if no sync), whether one or more line issues have been detected (with a Boolean True if one or more line issues are detected or False otherwise), or details regarding any detected line issues (with a list of errors within an array of strings if errors present or with empty arrays if no issues or errors are detected), and/or the like.

Similarly, the port provisioning parameters 335 may include, without limitation, at least one of actual downstream data rate (in kbps), actual upstream data rate (in kbps), purchased downstream data rate (in kbps) according to billing records or the like, purchased upstream data rate (in kbps) according to billing records or the like, whether a port is enabled (with a Boolean True if enabled or False otherwise), a configured bonding group identification ("ID") value (with the bonding group ID value listed as a string value, where different formats may be used depending on device type), whether the actual downstream or upstream data rate matches corresponding purchased downstream or upstream data rate (with a Boolean True if they match or False otherwise), whether one or more port profile issues have been detected (with a Boolean True if issues or errors are detected or False otherwise), or details regarding any detected port profile issues (with a list of errors within an array of strings if errors present or with empty arrays if no issues or errors are detected), and/or the like. In some cases, although not shown, a placeholder field(s) may be used for parameters in development or for future parameters, and may be intended to be a free-form object that may have more detailed, device-type specific data, or the like. Likewise, virtual cross connect ("VCC") parameters and statistics (shown in FIGS. 3B and 3C as being grouped with port provisioning parameters and statistics 335, although they may be separate fields) may include, but are not limited to, at least one of whether one or more cross connect issues have been detected (with a Boolean True if one or more cross connect issues or errors are detected or False otherwise), or details regarding any detected cross connect issues data comprising at least one of whether one or more cross connect issues have been detected, or details regarding any detected cross connect issues (with a list of errors within an array of strings if errors present or with empty arrays if no issues or errors are detected), and/or the like. Here, the statistics fields 330 and 335 may be null if the values are unknown.

Referring to FIGS. 3E and 3F, a UI 325 may be generated and presented to the user that displays provisioning and line statistics of the Internet service provided to the customer (e.g., in response to the user selecting the option or virtual button for showing provisioning and line statistics such as shown in FIG. 3D, or the like). As shown in the non-limiting embodiment of FIGS. 3E and 3F, for fiber optics-based Internet service, the UI 325 may display ONT parameters and statistics 330 (including normal ONT statistics 330c as shown in FIG. 3E and ONT statistics with errors 330d as shown in FIG. 3F) as well as status parameters and statistics 335 (including normal status statistics 335c shown in FIG. 3E and status statistics with errors 335d as shown in FIG. 3F). In some embodiments, the ONT parameters 330 and status parameters 335 may include, but are not limited to, at least one of card parameters, GPON port parameters, ONT parameters, ONT status, ONT performance, Ethernet port parameters, residential gateway ("RG") port parameters, plain old telephone service or plain ordinary telephone system ("POTS") port parameters, and/or the like.

In some cases, the card parameters may include, without limitation, at least one of the device ID, the administrator status, the administrator state, the type of device, the vector mode, the status, the operational state, the temperature level, the derived states, the common language equipment identification ("CLEI") code, the software version, the serial number, or the uptime value, and/or the like. In some instances, the GPON port parameters may include, without limitation, at least one of the administrator status, the administrator state, the status, the operational state, the derived states, or the CLEI code, and/or the like. In some cases, the ONT parameters may include, but are not limited to, at least one of the device ID, the administrator status, the administrator state, the serial number, the registration ID, the subscriber ID, the description, or the battery present field, and/or the like. In some instances, the ONT profile may include, without limitation, the ID, the name, the vendor, the POTS count, the fast Ethernet count, the RG count, or default ToRG, and/or the like.

In some cases, the ONT status may include, without limitation, at least one of the status, the operational state, the derived states, the vendor, the model, the CLEI code, the manufacture serial number, the uptime value, the uptime string value, the optical signal level, the response time, the transmit optical level, the receive optical level, or the range length, and/or the like. In some instances, the ONT performance (for predetermined time periods (e.g., current 15 minutes, current 24 hours, etc.)) may include, without limitation, at least one of the measured time, the measured time string, or the upstream and downstream parameters (each including, but not limited to, at least one of bit-interleaved parity ("BIP") errors, missed burst, missed burst in seconds, header error check ("HEC") errors, BIP errored in seconds, BIP unavailable in seconds, BIP severely errored in seconds, etc.), and/or the like. In some cases, the Ethernet port parameters may include, but are not limited to, at least one of the ID, the aid, the type, the administrator status, the administrator state, the subscriber ID, the description, the speed, the duplex, the disable on battery state, the RG port, the status (e.g., the status, the operational state, the derived states, the rate, the duplex, the power, or the maximum transmission unit ("MTU") size, or the like), the service, the traffic in and out (e.g., packets, bytes, unicast, multicast, broadcast, discards, errors, etc.), and/or the like.

In some instances, the RG port parameters may include, without limitation, at least one of the ID, the aid, the subscriber ID, the description, the administrator status, the administrator state, the management mode, the management profile, the wide area network ("WAN") protocol, the disable on battery state, the status (e.g., status, operational state, derived states, member ports, WAN protocol, virtual local area network ("VLAN"), IP, IP mask, IP gateway, media access control ("MAC") address, TR-069 or CPE WAN management protocol ("CWMP") status, etc.), or service (e.g., ID, name, port, port type, port type ID, description, administrator status, administrator state, status, operational state, bandwidth profile ID, bandwidth profile, multicast profile ID, multicast profile, service tag action ID, service tag action, VLAN out, VLAN in, etc.), and/or the like. In some cases, the POTS port parameters may include, but are not limited to, at least one of the ID, the aid, the administrator status, the administrator state, the subscriber ID, the description, the impedance, the signal type, the status (e.g., status, operational state, derived states, power status, transmission gain, or reception gain, etc.), or service (e.g., ID, port, administrator status, administrator state, status, operational state, derived states, profile, profile ID, common regional virtual private network ("CRV"), hook state, configuration status, or call state, etc.), and/or the like.

These and other functions of the system 100 (and its components) are described in greater detail below with respect to FIGS. 1, 2, and 4.

FIGS. 4A-4F (collectively, "FIG. 4") are flow diagrams illustrating a method 400 for implementing call center-based automated interface with network switches for Internet service diagnostics and provisioning, in accordance with various embodiments. Method 400 of FIG. 4A continues onto FIG. 4B following the circular marker denoted, "A," and/or continues onto FIG. 4C following the circular marker denoted, "B." Method 400 of FIG. 4D may continue onto FIG. 4E following the circular marker denoted, "C," and may continue onto FIG. 4F (from FIG. 4E) following the circular marker denoted, "D."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', 300", 300''', 300'''', and 300∝'''' of FIGS. 1, 2, 3A, 3B, 3C, 3D, 3E, and 3F, respectively (or components thereof), such methods may also be implemented using any suitable hardware (or software) implementation. Similarly, while each of the systems, examples, or embodiments 100, 200, 300, 300', 300", 300''', 300'''', and 300''''' of FIGS. 1, 2, 3A, 3B, 3C, 3D, 3E, and 3F, respectively (or components thereof), can operate according to the method 400 illustrated by FIG. 4 (e.g., by executing instructions embodied on a computer readable medium), the systems, examples, or embodiments 100, 200, 300, 300', 300", 300''', 300'''', and 300''''' of FIGS. 1, 2, 3A, 3B, 3C, 3D, 3E, and 3F can each also operate according to other modes of operation and/or perform other suitable procedures.

Figure 4A:
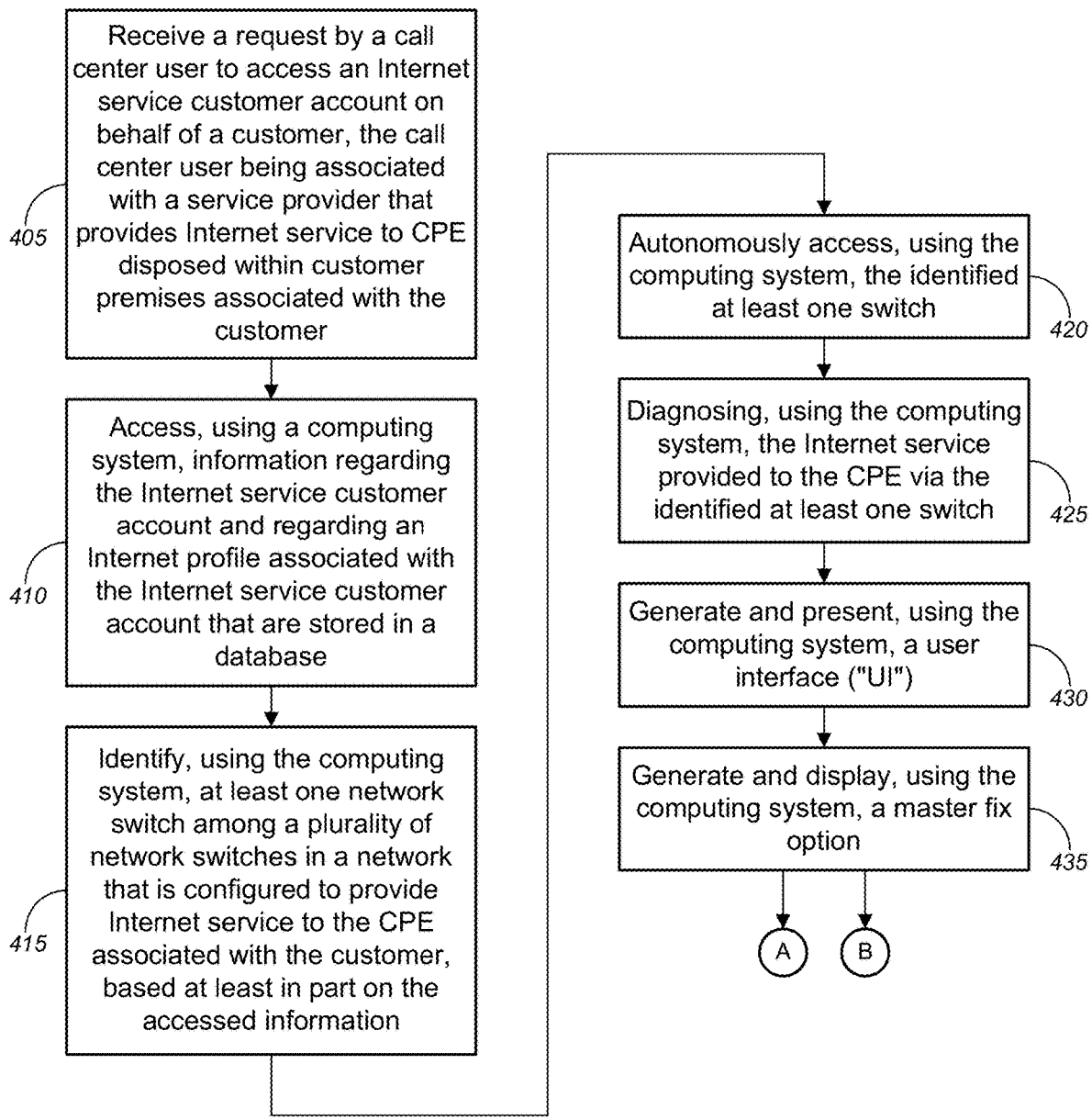

In the non-limiting embodiment of FIG. 4A, method 400, at block 405, may comprise receiving a request by a call center user to access an Internet service customer account on behalf of a customer, the call center user being associated with a service provider that provides Internet service to customer premises equipment ("CPE") disposed within customer premises associated with the customer. At block 410, method 400 may comprise, in response to receiving the request by the call center user to access the Internet service customer account on behalf of the customer, accessing, using a computing system, information regarding the Internet service customer account and regarding an Internet profile associated with the Internet service customer account that are stored in a database. Method 400 may further comprise, at block 415, identifying, using the computing system, at least one network switch among a plurality of network switches in a network that is configured to provide Internet service to the CPE associated with the customer, based at least in part on the accessed information.

In some embodiments, the computing system may include, without limitation, at least one of a network diagnostics computing system, a network provisioning computing system, a network service management computing system, a call center computing system, a server computer, a webserver, a cloud computing system, or a distributed computing system, and/or the like. In some cases, the Internet service may comprise at least one of Internet service via digital subscriber line ("DSL")-based technologies ("xDSL"), Internet service via coaxial cable-based technologies, Internet service via fiber optics-based technologies, or Internet service via copper wire-based technologies, and/or the like.

Merely by way of example, in some cases, the accessed information regarding the Internet service customer account may comprise at least one of: billing information associated with the Internet service customer account; customer line information associated with the Internet service customer account; line-specific information associated with the Internet service provided to the customer; network profile information associated with the Internet service provided to the customer; identification information of each of the at least one network switch; switch information for each of the at least one network switch; information regarding one or more features of the Internet service provided to the customer; information regarding any requested buried service wire ("BSW") tickets; or information regarding manual switch access for each of the at least one network switch; and/or the like.

Method 400 may further comprise autonomously accessing, using the computing system, the identified at least one network switch (block 420), and diagnosing, using the computing system, the Internet service provided to the CPE via the identified at least one network switch (block 425). At block 430, method 400 may comprise generating and presenting, using the computing system, a user interface ("UI"). Method 400 may further comprise, at block 435, generating and presenting, using the computing system and in the UI, a master fix option (similar to the master fix option depicted in FIGS. 3A and 3D, or the like) encapsulating consolidation of a plurality of issues diagnosed by the computing system and corresponding repair procedures within a single repair option without distillation into separate repair options for each diagnosed issue. In some instances, the UI may be generated and presented via a web portal to which the call center user is logged in.

Although not shown in FIG. 4, the method may further comprise initiating the additional repair procedures comprising at least one of: initiating the additional repair procedures comprising at least one of: dispatching a technician associated with the service provider to perform on-site repair procedures at the customer premises; dispatching a technician associated with the service provider to perform on-site repair procedures at the at least one network switch; or dispatching a technician associated with the service provider to perform on-site repair procedures at a physical location at which one or more nodes of the network are disposed; and/or the like.

Method 400 may either continue onto the process at block 440 in FIG. 4B following the circular marker denoted, "A," and/or continue onto the process at block 450 in FIG. 4C following the circular marker denoted, "B."

At block 440 in FIG. 4B (following the circular marker denoted, "A," in FIG. 4A), method 400 may comprise autonomously accessing, using the computing system and from a billing database, billing information associated with the Internet service customer account; and generating and presenting, using the computing system, the billing information within the UI for the call center user (block 445).

Alternatively, or additionally, at block 450 in FIG. 4C (following the circular marker denoted, "B," in FIG. 4A), method 400 may comprise generating and presenting, using the computing system, one or more options within the UI for the call center user to select to change at least one of one or more features of the Internet service customer account or one or more features of the Internet service provided to the CPE; receiving, using the computing system, one or more response messages in response to the call center user selecting at least one option among the one or more options (block 455); and generating and presenting, using the computing system, the one or more response messages within the UI for the call center user (block 460).

In some cases, the one or more response messages may include, without limitation, at least one of: a message indicating success; a message indicating no network inventory records found; a message indicating an application programming interface ("API") error; a message indicating an unsupported device with respect to the identified at least one network switch; a message indicating that the Internet service associated with the customer has been authenticated in response to a check authentication option; a message indicating that the Internet service associated with the customer has been authenticated and indicating without outage; a message indicating that the Internet service associated with the customer has been authenticated and indicating with ping failure but without outage; a message indicating that the Internet service associated with the customer has not been authenticated in response to a check authentication option; a message indicating that the Internet service associated with the customer has not been authenticated and indicating without outage; a message indicating that the Internet service associated with the customer has not been authenticated and indicating existing outage; a message indicating that the Internet service associated with the customer has not been authenticated and indicating emerging outage; a message indicating that there are no active broadband services; a message indicating that no high speed Internet ("HSI") assignment record has been found; a message indicating a missing required parameter; a message indicating success in response to selecting a check aggregator option; a message indicating success and indicating true html format in response to selecting a check aggregator option; a message indicating invalid aggregator type; a message indicating successful test result with no issues in response to selecting a metallic line test ("MLT") option; a message indicating successful test result with ring to ground low resistance issues detected in response to selecting a MLT option; a message indicating successful test result multiple issues detected in response to selecting a MLT option; a message indicating that a device is not configured for MLT; a message indicating that metallic line testing is not available for a device type; a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues, and/or the like; a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues, and/or the like; a message indicating virtual cross connect ("VCC") data comprising at least one of whether one or more cross connect issues have been detected, or details regarding any detected cross connect issues, and/or the like; a message indicating successful rebuild of network switch provisioning; a message indicating a missing nonce error; a message indicating an invalid nonce error; a message indicating success pertaining to clearing of IP leases to release IP addresses for use by other devices; a message indicating an error pertaining to a missing required parameter; or a message indicating an error pertaining to an unsupported device; and/or the like.

Figure 4D:
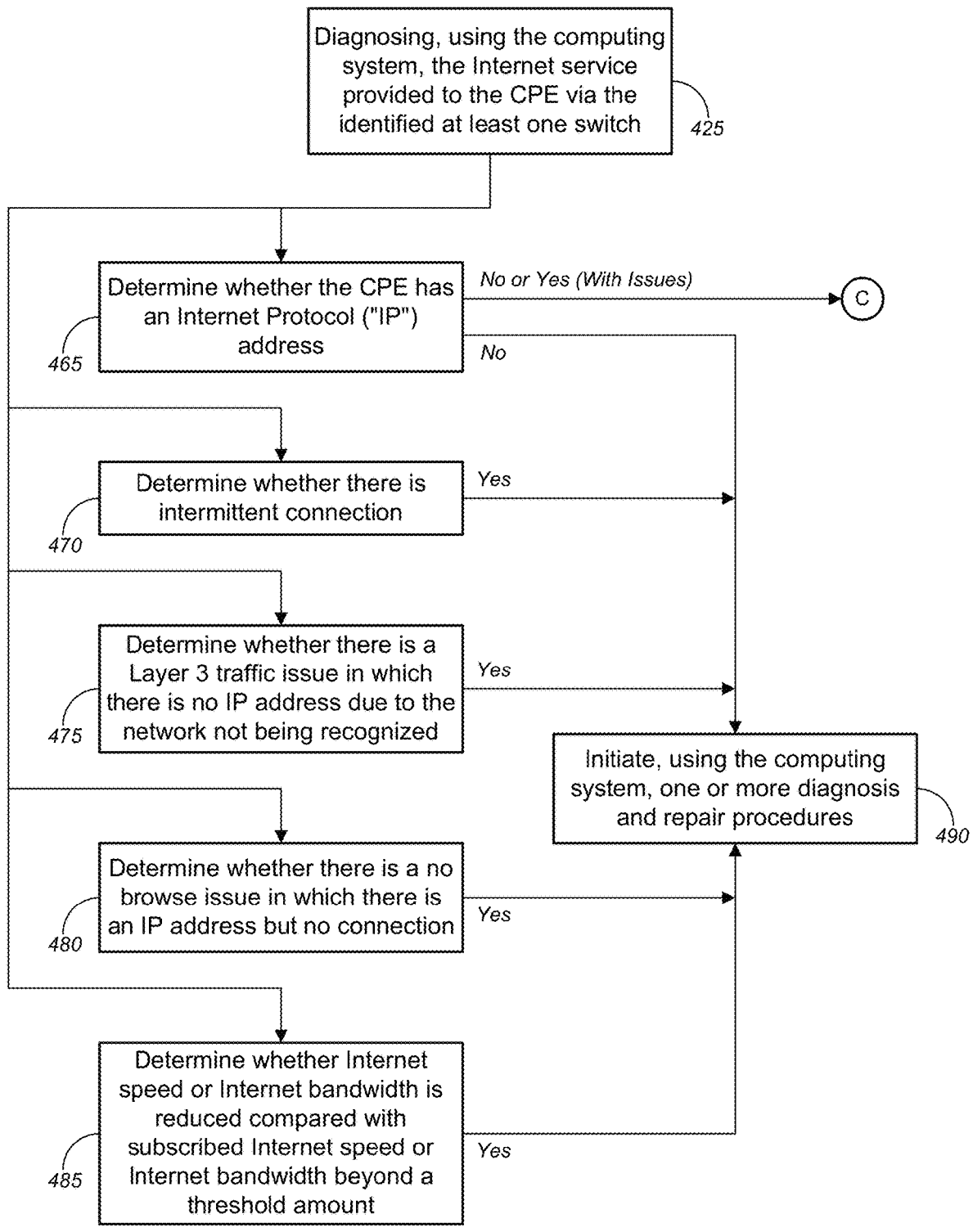

With reference to the non-limiting example of FIG. 4D, diagnosing, using the computing system, the Internet service provided to the CPE via the identified at least one network switch (at block 425) may comprise at least one of: whether the CPE has an Internet Protocol ("IP") address (block 465); determining whether there is intermittent connection (e.g., intermittent connection between the CPE and one or more of the identified at least one network switch, the aggregator node, or an Internet router based on current or historical diagnosis, or the like) (block 470); determining whether there is a Layer 3 traffic issue in which there is no IP address due to the network not being recognized (block 475); determining whether there is a no browse issue in which there is an IP address but no connection (block 480); or determining whether Internet speed or Internet bandwidth is reduced compared with subscribed Internet speed or Internet bandwidth beyond a threshold amount (block 485); and/or the like. In some cases, the threshold amount may include, without limitation, a threshold percentage amount (e.g., 1, 2, 3, 4, 5, 10, 15, 20, 25, 30, 35, 40, 45, or 50%, or a range between 1 and 50%, of the subscribed Internet speed or Internet bandwidth, or the like), a threshold speed or bandwidth value (e.g., 1, 2, 3, 4, 5, 10, 15, 20, 25, 30, 35, 40, 45, 50, 60, 70, 80, 90, 100, 200, 300, 400, 500 Mbps, or a range between 1 and 500 Mbps, reduction compared with subscribed Internet speed or Internet bandwidth, or the like). Herein, "Internet speed" may refer to the speed at which a particular amount of data (e.g., 1 Mb, or the like) is either uploaded or downloaded to or from a data source to a data destination, while "Internet bandwidth" may refer to the maximum amount of data that can be uploaded or downloaded within a particular amount of time (e.g., 1 s, or the like). Thus, although Internet speed and Internet bandwidth may both appear to share units of measure (e.g., Mbps or kbps, etc.), they are subtly different from one another.

In response to at least one of a determination that the CPE does not have an IP address, a determination that there is a intermittent connection, a determination that there is a Layer 3 traffic issue, a determination that there is a no browse issue, or a determination there is reduced Internet speed or bandwidth, method 400 method may proceed to the process at 490, at which method 400 may comprise initiating, using the computing system, one or more diagnosis and repair procedures. Alternatively, or additionally, in response to either a determination that the CPE does not have an IP address or a determination that the CPE does have an IP address but other issues exist, method 400 may continue to the process at 465a in FIG. 4E following the circular marker denoted, "C."

In some embodiments, initiating, using the computing system, one or more diagnosis and repair procedures (at block 490) may comprise, based on a determination that the CPE does not have an IP address but the one or more other CPEs have IP addresses, determining, using the computing system, whether the lack of IP address can be addressed by at least one of: the CPE being powered on or rebooted; changing or updating configuration settings on the CPE; or fixing any issues with one or more Internet communication lines within the customer premises; and/or the like.

Alternatively, initiating, using the computing system, one or more diagnosis and repair procedures (at block 490) may comprise, based on a determination that the CPE does not have an IP address and at least one other CPE among the one or more other CPEs do not have IP addresses, determining, using the computing system, whether the lack of IP address can be addressed by at least one of: fixing the identified at least one network switch that is determined to be offline or non-functional; changing or updating configuration settings on the identified at least one network switch; or fixing any partial or complete cuts in one or more Internet communication lines between the identified at least one network switch and the CPE; and/or the like.

Alternatively, initiating, using the computing system, one or more diagnosis and repair procedures (at block 490) may comprise, based on a determination that there is intermittent connection between the CPE and one or more of the identified at least one network switch, the aggregator node, or the Internet router, determining, using the computing system, whether the intermittent connection can be addressed by at least one of: the CPE being powered on or rebooted; fixing any errors building on one or more Internet communication lines between the CPE and the one or more of the identified at least one network switch, the aggregator node, or the Internet router; or fixing any partial or complete cuts in one or more Internet communication lines between the CPE and the one or more of the identified at least one network switch, the aggregator node, or the Internet router; and/or the like.

Alternatively, initiating, using the computing system, one or more diagnosis and repair procedures (at block 490) may comprise, based on a determination that there is a Layer 3 traffic issue in which there is no IP address due to the network not being recognized, determining, using the computing system, whether the Layer 3 traffic issue can be addressed by at least one of: fixing any potential sources of the Layer 3 traffic issue in the identified at least one network switch; fixing any potential sources of the Layer 3 traffic issue in the aggregator node; or fixing any potential sources of the Layer 3 traffic issue in the Internet router; and/or the like.

Alternatively, initiating, using the computing system, one or more diagnosis and repair procedures (at block 490) may comprise, based on a determination that there is a no browse issue in which there is an IP address but no connection, determining, using the computing system, whether the no browse issue can be addressed by at least one of: rebuilding the Internet profile associated with the Internet service customer account; bouncing one or more ports of the identified at least one network switch; or causing the CPE to request a new IP address; and/or the like.

Alternatively, initiating, using the computing system, one or more diagnosis and repair procedures (at block 490) may comprise, based on a determination that Internet speed or Internet bandwidth is reduced compared with subscribed Internet speed or Internet bandwidth beyond a threshold amount, determining, using the computing system, whether the reduced Internet speed or Internet bandwidth can be addressed by at least one of: changing, updating, or correcting the Internet profile associated with the Internet service customer account; changing or updating configuration settings in the CPE; changing or updating configuration settings in the identified at least one network switch; changing or updating configuration settings in the aggregator node; replacing the CPE; or rerouting network traffic through one or more other nodes in the network; and/or the like.

Figure 4E:
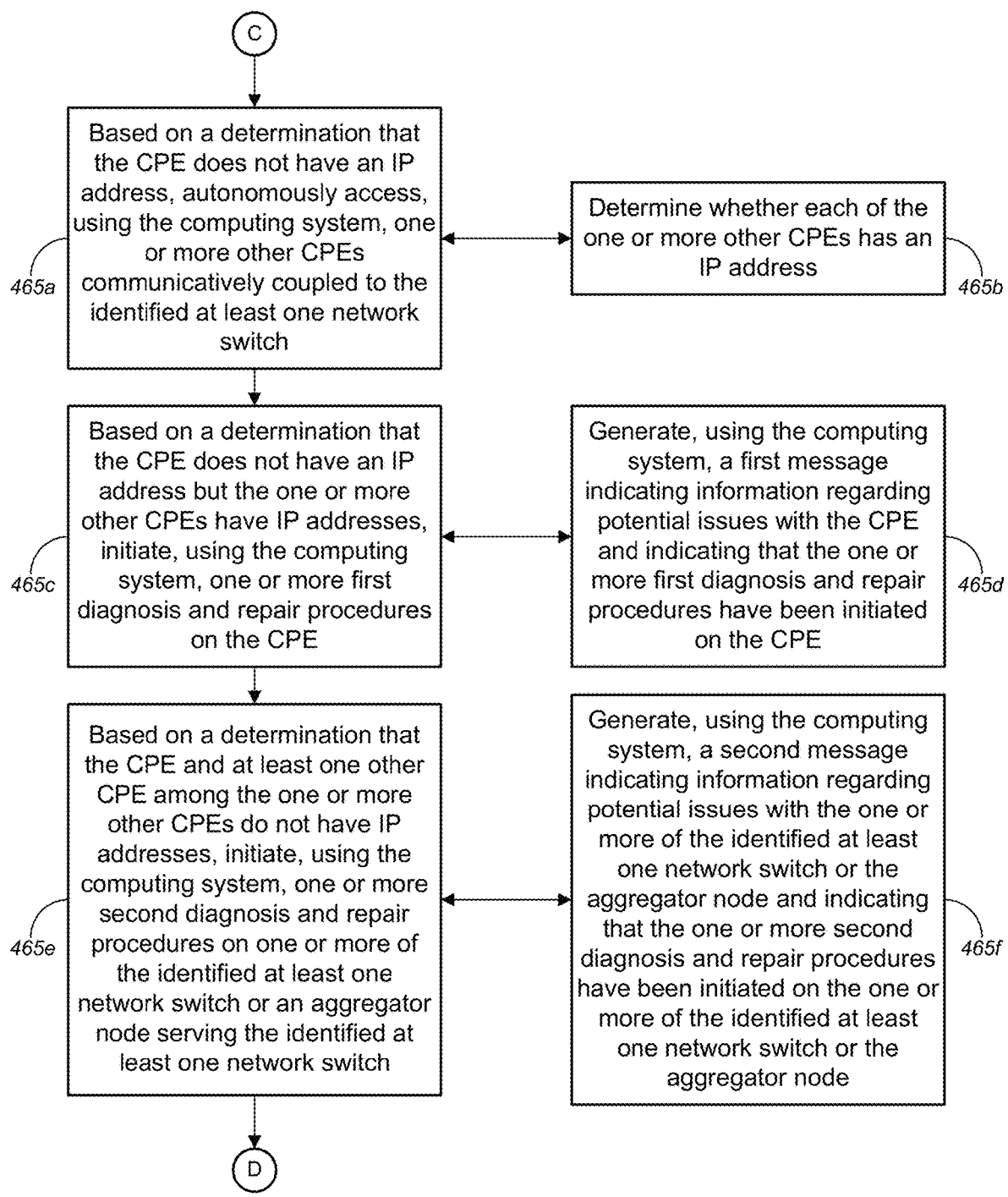

At block 465a in FIG. 4E (following the circular marker denoted, "C," in FIG. 4D), method 400 may comprise, based on a determination that the CPE does not have an IP address, autonomously accessing, using the computing system, one or more other CPEs communicatively coupled to the identified at least one network switch, and determining whether each of the one or more other CPEs has an IP address (block 465b). Method 400 may further comprise, based on a determination that the CPE does not have an IP address but the one or more other CPEs have IP addresses, initiating, using the computing system, one or more first diagnosis and repair procedures on the CPE (block 465c), and generating, using the computing system, a first message indicating information regarding potential issues with the CPE and indicating that the one or more first diagnosis and repair procedures have been initiated on the CPE (block 465d).

Method 400 may further comprise, based on a determination that the CPE and at least one other CPE among the one or more other CPEs do not have IP addresses, initiating, using the computing system, one or more second diagnosis and repair procedures on one or more of the identified at least one network switch or an aggregator node serving the identified at least one network switch (block 465e), and generating, using the computing system, a second message indicating information regarding potential issues with the one or more of the identified at least one network switch or the aggregator node and indicating that the one or more second diagnosis and repair procedures have been initiated on the one or more of the identified at least one network switch or the aggregator node (block 465*f*). Method 400 may continue to the process at 465*g* in FIG. 4F following the circular marker denoted, "D."

Figure 4F:
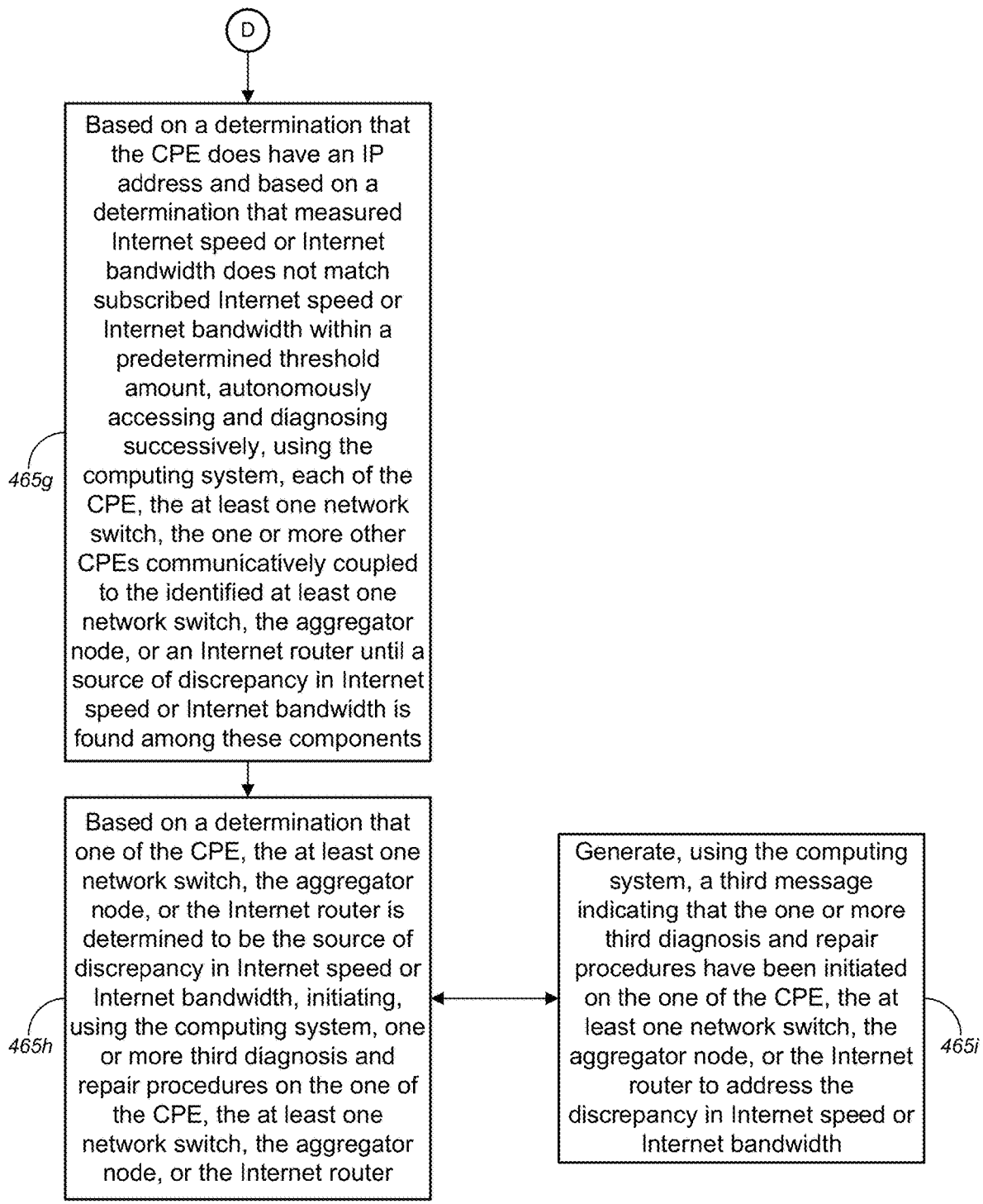

At block 465*g* in FIG. 4F (following the circular marker denoted, "D," in FIG. 4E), method 400 may comprise, based on a determination that the CPE does have an IP address and based on a determination that measured Internet speed or Internet bandwidth does not match subscribed Internet speed or Internet bandwidth within a predetermined threshold amount, autonomously accessing and diagnosing successively, using the computing system, each of the CPE, the at least one network switch, the one or more other CPEs communicatively coupled to the identified at least one network switch, the aggregator node, or an Internet router until a source of discrepancy in Internet speed or Internet bandwidth is found among these components. In some cases, the predetermined threshold amount, which may be similar to the threshold amount described above, may include, without limitation, a threshold percentage amount (e.g., 1, 2, 3, 4, 5, 10, 15, 20, 25, 30, 35, 40, 45, or 50%, or a range between 1 and 50%, of the subscribed Internet speed or Internet bandwidth, or the like), a threshold speed or bandwidth value (e.g., 1, 2, 3, 4, 5, 10, 15, 20, 25, 30, 35, 40, 45, 50, 60, 70, 80, 90, 100, 200, 300, 400, 500 Mbps, or a range between 1 and 500 Mbps, reduction compared with subscribed Internet speed or Internet bandwidth, or the like).

Method 400 may further comprise, based on a determination that one of the CPE, the at least one network switch, the aggregator node, or the Internet router is determined to be the source of discrepancy in Internet speed or Internet bandwidth, initiating, using the computing system, one or more third diagnosis and repair procedures on the one of the CPE, the at least one network switch, the aggregator node, or the Internet router (block 465*h*), and generating, using the computing system, a third message indicating that the one or more third diagnosis and repair procedures have been initiated on the one of the CPE, the at least one network switch, the aggregator node, or the Internet router to address the discrepancy in Internet speed or Internet bandwidth (block 465*i*).

The following are two non-limiting use cases cover two of the types of Internet service that the system is capable of diagnosing and provisioning—namely, DSL-based Internet service and fiber optics-based Internet service. Similar to FIG. 3 above, the various embodiments are not so limited, and the system may be used to diagnose and provision Internet or broadband services using other Internet technologies, including but not limited to, at least one of a frequency division vectoring service, a microwave radio service, a millimeter-wave radio service, a free-space optical service, a data over cable service interface specification ("DOCSIS")-based cable service, or a fixed backhaul wireless service, and/or the like.

In the DSL-based Internet service use case, the identified at least one network switch may comprise a digital subscriber line access multiplexers ("DSLAM") among a plurality of DSLAMs in the network, and the CPE may comprise a DSL-based modulator-demodulator ("modem"). In such cases, at least one of the one or more first repair procedures and the one or more second repair procedures may comprise at least one of: remote, network-based diagnostics and repair, initiated by the computing system, of the DSL-based modem; remote, network-based metallic line diagnostics and repair, initiated by the computing system, of copper lines between the identified DSLAM and the customer premises associated with the customer; remote, network-based switch level diagnostics and repair, initiated by the computing system, of the identified DSLAM; or remote, network-based diagnostics and repair, initiated by the computing system, of one or more nodes in the network that are communicatively coupled with the identified DSLAM; and/or the like.

In some instances, the remote, network-based diagnostics and repair of the DSL-based modem may comprise at least one of remote restarting or rebooting, remote reconfiguration, remote software updating, or remote port bouncing of the DSL-based modem, and/or the like. In some cases, the remote, network-based diagnostics and repair of the identified DSLAM may comprise at least one of remote restarting or rebooting, remote reconfiguration, remote software updating, or remote port bouncing of the identified DSLAM, and/or the like. In some instances, the remote, network-based diagnostics and repair of the identified DSLAM may comprise at least one of remote restarting or rebooting, remote reconfiguration, remote software updating, or remote port bouncing of the one or more nodes, and/or the like. In some cases, the one or more nodes may comprise at least one of one or more broadband remote access servers ("BRAS"), one or more aggregator nodes, or one or more Internet nodes, and/or the like.

Alternatively, in the fiber optics-based Internet service use case, the identified at least one network switch may comprise an optical line terminal ("OLT") among a plurality of OLTs in the network, and the CPE may comprise an optical network unit ("ONU") or an optical network terminal ("ONT"). In such cases, at least one of the one or more first repair procedures and the one or more second repair procedures may comprise at least one of: remote, network-based diagnostics and repair, initiated by the computing system, of the ONU or ONT; remote, network-based metallic line diagnostics and repair, initiated by the computing system, of optical fiber lines between the OLT and the customer premises associated with the customer; remote, network-based switch level diagnostics and repair, initiated by the computing system, of the OLT; or remote, network-based diagnostics and repair, initiated by the computing system, of one or more nodes in the network that are communicatively coupled with the OLT; and/or the like.

In some instances, the remote, network-based diagnostics and repair of the ONU or ONT may comprise at least one of remote restarting or rebooting, remote reconfiguration, remote software updating, or remote port bouncing of the ONU or ONT, and/or the like. In some cases, the remote, network-based diagnostics and repair of the OLT may comprise at least one of remote restarting or rebooting, remote reconfiguration, remote software updating, or remote port bouncing of the OLT, and/or the like. In some instances, the remote, network-based diagnostics and repair of the OLT may comprise at least one of remote restarting or rebooting, remote reconfiguration, remote software updating, or remote port bouncing of the one or more nodes, and/or the like. In some cases, the one or more nodes may comprise at least one of one or more core switches, one or more aggregator nodes, or one or more Internet nodes, and/or the like.

Alternatively, or additionally, as shown and described above with respect to FIG. 2, or the like, application programming interface ("API") may be used by the computing system to access devices or components within the network(s). In some cases, accessing the information regarding the Internet service customer account and regarding the Internet profile that are stored in the database may comprise accessing the database via a first API between the computing system and the database. Likewise, autonomously accessing the identified at least one network switch may comprise autonomously accessing the identified at least one network switch via a second API between the computing system and each of the identified at least one network switch. Similarly, autonomously accessing the one or more other CPEs communicatively coupled to the identified at least one network switch may comprise autonomously accessing, using the computing system, the one or more other CPEs communicatively coupled to the identified at least one network switch via one or more third APIs between the computing system and the one or more other CPEs. In some instances, initiating the one or more second diagnosis and repair procedures may comprise initiating, using the computing system, the one or more second diagnosis and repair procedures on the aggregator node serving the identified at least one network switch. In some cases, initiating the one or more second diagnosis and repair procedures on the aggregator node may comprise autonomously accessing the aggregator node via a fourth API between the computing system and the aggregator node.

In some aspects, each of initiating the one or more first diagnosis and repair procedures (at block 465c), initiating the one or more second diagnosis and repair procedures (at block 465e), or initiating the one or more third diagnosis and repair procedures (at block 465h) may comprise one of: autonomously initiating, using the computing system, respective one of the one or more first diagnosis and repair procedures, the one or more second diagnosis and repair procedures, or the one or more third diagnosis and repair procedures; or initiating, using the computing system, respective one of the one or more first diagnosis and repair procedures, the one or more second diagnosis and repair procedures, or the one or more third diagnosis and repair procedures in response to receiving a selection, by the call center user, of a master fix option that is generated and displayed within the UI (similar to the master fix option depicted in FIGS. 3A and 3D, or the like), the master fix option encapsulating consolidation of a plurality of issues diagnosed by the computing system and corresponding repair procedures within a single repair option without distillation into separate repair options for each diagnosed issue.

Alternatively, or additionally, generating and presenting the UI may comprise displaying at least one of the accessed information regarding the Internet service customer account (from block 410), the accessed information regarding the Internet profile (from block 410), the first message (from block 465d), the second message (from block 465f), or the third message (from block 465i), and/or the like.

Exemplary System and Hardware Implementation

Figure 5:
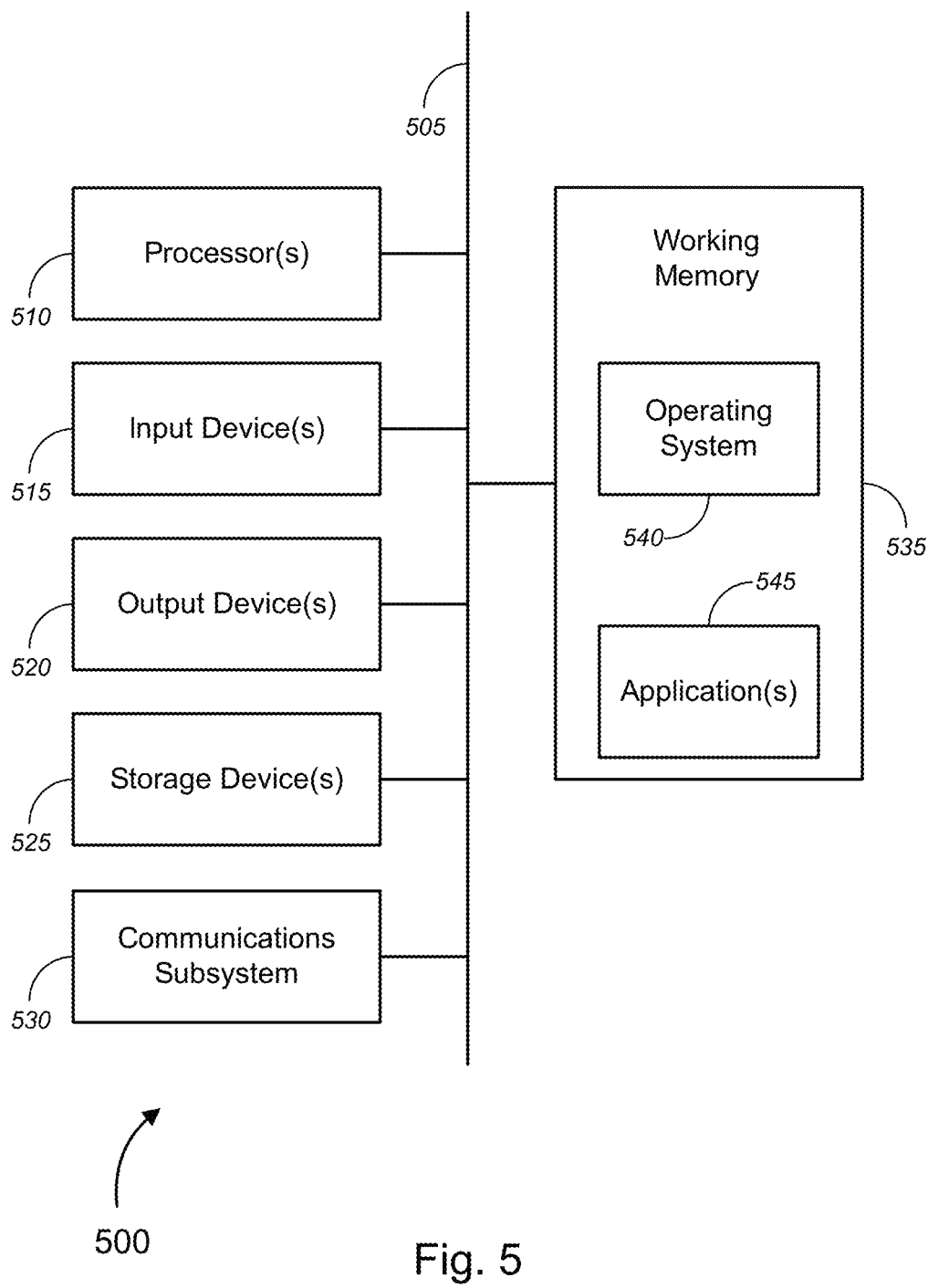
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a, 105b, and 205, user terminals 115a-115n and 215a, network switches 145a-145n and 245, nodes 150a-150n and 250, customer premises equipment ("CPEs") 130a-130n and 230, user devices 170a-170n and 270, and telephone 215b, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a, 105b, and 205, user terminals 115a-115n and 215a, network switches 145a-145n and 245, nodes 150a-150n and 250, CPEs 130a-130n and 230, user devices 170a-170n and 270, and telephone 215b, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
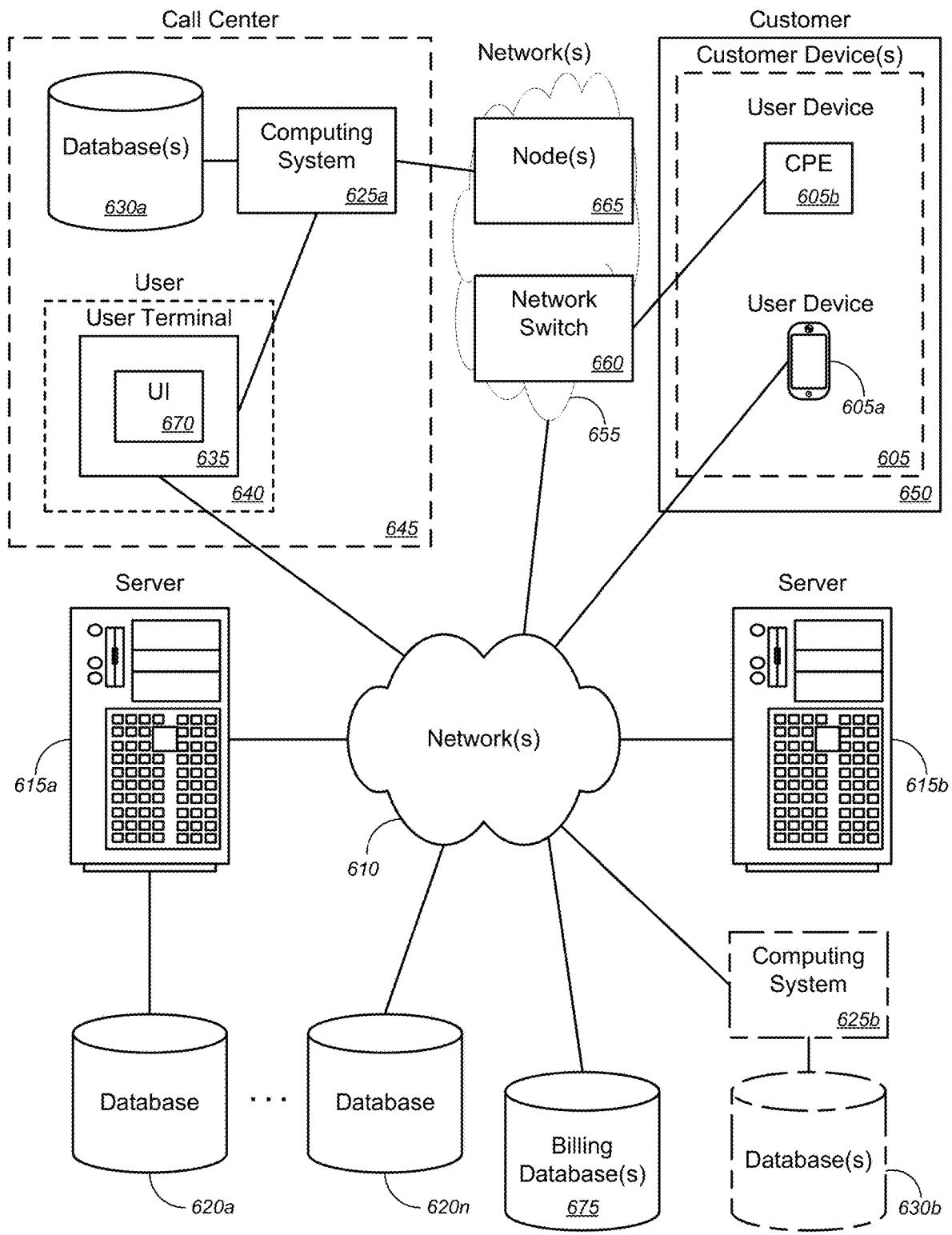
FIG. 6 is a block diagram illustrating a networked system of computers, computing systems, or system hardware architecture, which can be used in accordance with various embodiments.

As noted above, a set of embodiments comprises methods and systems for implementing Internet service diagnostics and provisioning, and, more particularly, to methods, systems, and apparatuses for implementing call center-based automated interface with network switches for Internet service diagnostics and provisioning. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 155 and 255 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing Internet service diagnostics and provisioning, and, more particularly, to methods, systems, and apparatuses for implementing call center-based automated interface with network switches for Internet service diagnostics and provisioning, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625a and corresponding database(s) 630a (similar to computing systems 105a and 205 and corresponding database(s) 110a and 210 of FIGS. 1 and 2, or the like) and user terminal 635 operated by user 640 (similar to user terminals 115a-115n and 215a operated by corresponding users 120a-120n and 220 of FIGS. 1 and 2, or the like), all of which may be disposed at call center 645 (similar to call center 125 and 225 of FIGS. 1 and 2, or the like). Alternative or additional to local computing system 625a and corresponding database(s) 630a, system 600 may further comprise remote computing system 625b and corresponding database(s) 630b (similar to computing system 105b and corresponding database(s) 110b of FIG. 1, or the like). System 600 may further comprise network(s) 655 over which a customer 650 may communicate with user terminal 635 at call center 645 (e.g., at call center telephone 215b of FIG. 2, or the like) using customer device 605 (e.g., user device 605a, or the like; similar to user devices 170a-170n and 270 of FIGS. 1 and 2, or the like). In some cases, network(s) 655 may be the same as network(s) 610. Alternatively, network(s) 655 (e.g., a public switched telephone network ("PSTN"), or the like) may be different from network(s) 610 (e.g., a cellular phone network, a VoIP network, the Internet, or the like). System 600 may further comprise switch 660 (similar to switches 145a-145n and 245 of FIGS. 1 and 2, or the like) and node(s) 665 (similar to nodes 150a-150n and 250 of FIGS. 1 and 2, or the like), both of which may be disposed in network(s) 655, or the like, and provide Internet service to customer premises equipment ("CPE") 605b (similar to CPEs 130a-130n and 230 of FIGS. 1 and 2, or the like) that is associated with customer 650. System 600 may further comprise user interface ("UI") 670 (similar to UIs 160a-160n and 260 of FIGS. 1 and 2, or the like) on user terminal 635 and billing database(s) 675 (similar to billing database(s) 165 and 265 of FIGS. 1 and 2, or the like).

In operation, computing system 625a and/or 625b (collectively, "computing system" or the like) may receive a request by a call center user (e.g., user 640, or the like) to access an Internet service customer account on behalf of a customer (e.g., customer 650, or the like), the call center user being associated with the service provider that provides Internet service to a CPE disposed within customer premises associated with the customer (e.g., CPE 605b disposed within customer premises associated with customer 650, or the like). In response to receiving the request by the call center user to access the Internet service customer account on behalf of the customer, the computing system may access information regarding the Internet service customer account and regarding an Internet profile associated with the Internet service customer account that are stored in a database (e.g., database(s) 630a and/or 630b, or the like). The computing system may identify at least one network switch (e.g., network switch 660, or the like) among a plurality of network switches (e.g., network switches 660, or the like) in a network (e.g., network(s) 655) that is configured to provide Internet service to the CPE associated with the customer (e.g., customer 650, or the like), based at least in part on the accessed information (i.e., information regarding the Internet service customer account and/or information regarding an Internet profile associated with the Internet service customer account, or the like).

The computing system may autonomously access the identified at least one network switch and may diagnose the Internet service provided to the CPE via the identified at least one network switch. In some embodiments, diagnosing the Internet service may include, without limitation, determining whether the CPE has an Internet Protocol ("IP") address. Based on a determination that the CPE does not have an IP address, the computing system may autonomously access one or more other CPEs communicatively coupled to the identified at least one network switch, and may determine whether each of the one or more other CPEs has an IP address. Based on a determination that the CPE does not have an IP address but the one or more other CPEs have IP addresses, the computing system may initiate one or more first diagnosis and repair procedures on the CPE, and may generate a first message indicating information regarding potential issues with the CPE and indicating that the one or more first diagnosis and repair procedures have been initiated on the CPE. Based on a determination that the CPE and at least one other CPE among the one or more other CPEs do not have IP addresses, the computing system may initiate one or more second diagnosis and repair procedures on one or more of the identified at least one network switch or an aggregator node serving the identified at least one network switch, and may generate a second message indicating information regarding potential issues with the one or more of the identified at least one network switch or the aggregator node and indicating that the one or more second diagnosis and repair procedures have been initiated on the one or more of the identified at least one network switch or the aggregator node. The computing system may generate and present a user interface ("UI"; e.g., a corresponding UI among UIs 670, or the like) presented on corresponding user terminal among the plurality of user terminals (e.g., a user terminal among the user terminals 635, or the like) displaying at least one of the accessed information regarding the Internet service customer account, the accessed information regarding the Internet profile, the first message, or the second message, and/or the like.

According to some embodiments, the identified at least one network switch may include a digital subscriber line access multiplexers ("DSLAM") among a plurality of DSLAMs in the network, and the CPE may include a DSL-based modem. In such cases, at least one of the one or more first repair procedures and the one or more second repair procedures may include, without limitation, at least one of: remote, network-based diagnostics and repair, initiated by the computing system, of the DSL-based modem; remote, network-based metallic line diagnostics and repair, initiated by the computing system, of copper lines between the identified DSLAM and the customer premises associated with the customer; remote, network-based switch level diagnostics and repair, initiated by the computing system, of the identified DSLAM; or remote, network-based diagnostics and repair, initiated by the computing system, of one or more nodes in the network that are communicatively coupled with the identified DSLAM; and/or the like.

In some instances, the remote, network-based diagnostics and repair of the DSL-based modem may include, but is not limited to, at least one of remote restarting or rebooting, remote reconfiguration, remote software updating, or remote port bouncing of the DSL-based modem, and/or the like. In some cases, the remote, network-based diagnostics and repair of the identified DSLAM may include, without limitation, at least one of remote restarting or rebooting, remote reconfiguration, remote software updating, or remote port bouncing of the identified DSLAM, and/or the like. In some instances, the remote, network-based diagnostics and repair of the identified DSLAM may include, but is not limited to, at least one of remote restarting or rebooting, remote reconfiguration, remote software updating, or remote port bouncing of the one or more nodes, and/or the like. In some cases, the one or more nodes (e.g., nodes 665, or the like) may include, but are not limited to, at least one of one or more broadband remote access servers ("BRAS"), one or more aggregator nodes, or one or more Internet nodes, and/or the like.

Alternatively, the identified at least one network switch may include an optical line terminal ("OLT") among a plurality of OLTs in the network, and the CPE may include an optical network unit ("ONU") or an optical network terminal ("ONT"). In such cases, at least one of the one or more first repair procedures and the one or more second repair procedures may include, without limitation, at least one of: remote, network-based diagnostics and repair, initiated by the computing system, of the ONU or ONT; remote, network-based metallic line diagnostics and repair, initiated by the computing system, of optical fiber lines between the OLT and the customer premises associated with the customer; remote, network-based switch level diagnostics and repair, initiated by the computing system, of the OLT; or remote, network-based diagnostics and repair, initiated by the computing system, of one or more nodes in the network that are communicatively coupled with the OLT; and/or the like.

In some instances, the remote, network-based diagnostics and repair of the ONU or ONT may include, but is not limited to, at least one of remote restarting or rebooting, remote reconfiguration, remote software updating, or remote port bouncing of the ONU or ONT, and/or the like. In some cases, the remote, network-based diagnostics and repair of the OLT may include, without limitation, at least one of remote restarting or rebooting, remote reconfiguration, remote software updating, or remote port bouncing of the OLT, and/or the like. In some instances, the remote, network-based diagnostics and repair of the OLT may include, but is not limited to, at least one of remote restarting or rebooting, remote reconfiguration, remote software updating, or remote port bouncing of the one or more nodes, and/or the like. In some cases, the one or more nodes may include, without limitation, at least one of one or more core switches, one or more aggregator nodes, or one or more Internet nodes, and/or the like.

In some embodiments, the UI may be generated and presented via a web portal to which the call center user is logged in. In some cases, accessing the information regarding the Internet service customer account and regarding the Internet profile that are stored in the database may comprise accessing the database via a first application programming interface ("API") between the computing system and the database. Likewise, autonomously accessing the identified at least one network switch may comprise autonomously accessing the identified at least one network switch via a second API between the computing system and each of the identified at least one network switch. Similarly, autonomously accessing the one or more other CPEs communicatively coupled to the identified at least one network switch may comprise autonomously accessing the one or more other CPEs communicatively coupled to the identified at least one network switch via one or more third APIs between the computing system and the one or more other CPEs. In some instances, initiating the one or more second diagnosis and repair procedures may comprise initiating the one or more second diagnosis and repair procedures on the aggregator node serving the identified at least one network switch. In some cases, initiating the one or more second diagnosis and repair procedures on the aggregator node may comprise autonomously accessing the aggregator node via a fourth API between the computing system and the aggregator node.

In some embodiments, diagnosing Internet service provided to the CPE via the identified at least one network switch may further include, without limitation, at least one of: determining whether there is intermittent connection between the CPE and one or more of the identified at least one network switch, the aggregator node, or an Internet router based on current or historical diagnosis; determining whether there is a Layer 3 traffic issue in which there is no IP address due to the network not being recognized; determining whether there is a no browse issue in which there is an IP address but no connection; or determining whether Internet speed or Internet bandwidth is reduced compared with subscribed Internet speed or Internet bandwidth beyond a threshold amount; and/or the like.

According to some embodiments, based on a determination that the CPE does not have an IP address but the one or more other CPEs have IP addresses, the computing system may determine whether the lack of IP address can be addressed by at least one of: the CPE being powered on or rebooted; changing or updating configuration settings on the CPE; or fixing any issues with one or more Internet communication lines within the customer premises; and/or the like. Alternatively, based on a determination that the CPE does not have an IP address and at least one other CPE among the one or more other CPEs do not have IP addresses, the computing system may determine whether the lack of IP address can be addressed by at least one of: fixing the identified at least one network switch that is determined to be offline or non-functional; changing or updating configuration settings on the identified at least one network switch; or fixing any partial or complete cuts in one or more Internet communication lines between the identified at least one network switch and the CPE; and/or the like. Alternatively, based on a determination that there is intermittent connection between the CPE and one or more of the identified at least one network switch, the aggregator node, or the Internet router, the computing system may determine whether the intermittent connection can be addressed by at least one of: the CPE being powered on or rebooted; fixing any errors building on one or more Internet communication lines between the CPE and the one or more of the identified at least one network switch, the aggregator node, or the Internet router; or fixing any partial or complete cuts in one or more Internet communication lines between the CPE and the one or more of the identified at least one network switch, the aggregator node, or the Internet router; and/or the like.

Alternatively, based on a determination that there is a Layer 3 traffic issue in which there is no IP address due to the network not being recognized, the computing system may determine whether the Layer 3 traffic issue can be addressed by at least one of: fixing any potential sources of the Layer 3 traffic issue in the identified at least one network switch; fixing any potential sources of the Layer 3 traffic issue in the aggregator node; or fixing any potential sources of the Layer 3 traffic issue in the Internet router; and/or the like. Alternatively, based on a determination that there is a no browse issue in which there is an IP address but no connection, the computing system may determine whether the no browse issue can be addressed by at least one of: rebuilding the Internet profile associated with the Internet service customer account; bouncing one or more ports of the identified at least one network switch; or causing the CPE to request a new IP address; and/or the like. Alternatively, based on a determination that Internet speed or Internet bandwidth is reduced compared with subscribed Internet speed or Internet bandwidth beyond a threshold amount, the computing system may determine whether the reduced Internet speed or Internet bandwidth can be addressed by at least one of: changing, updating, or correcting the Internet profile associated with the Internet service customer account; changing or updating configuration settings in the CPE; changing or updating configuration settings in the identified at least one network switch; changing or updating configuration settings in the aggregator node; replacing the CPE; or rerouting network traffic through one or more other nodes in the network; and/or the like.

Merely by way of example, in some cases, the accessed information regarding the Internet service customer account may comprise at least one of: billing information associated with the Internet service customer account; customer line information associated with the Internet service customer account; line-specific information associated with the Internet service provided to the customer; network profile information associated with the Internet service provided to the customer; identification information of each of the at least one network switch; switch information for each of the at least one network switch; information regarding one or more features of the Internet service provided to the customer; information regarding any requested buried service wire ("BSW") tickets; or information regarding manual switch access for each of the at least one network switch; and/or the like.

According to some embodiments, the computing system may autonomously access, from a billing database (e.g., billing database 675, which may be communicatively coupled on at least one of computing system 625a and/or 625b, and may be disposed either at call center 645 and/or in network(s) 655, or the like), billing information associated with the Internet service customer account; and may generate and present the billing information within the UI for the call center user.

In some embodiments, the computing system may generate and present one or more options within the UI for the call center user to select to change at least one of one or more features of the Internet service customer account or one or more features of the Internet service provided to the CPE, and/or the like; may receive one or more response messages in response to the call center user selecting at least one option among the one or more options; and may generate and present the one or more response messages within the UI for the call center user.

In some instances, the one or more response messages may include, but are not limited to, at least one of: a message indicating success; a message indicating no network inventory records found; a message indicating an application programming interface ("API") error; a message indicating an unsupported device with respect to the identified at least one network switch; a message indicating that the Internet service associated with the customer has been authenticated in response to a check authentication option; a message indicating that the Internet service associated with the customer has been authenticated and indicating without outage; a message indicating that the Internet service associated with the customer has been authenticated and indicating with ping failure but without outage; a message indicating that the Internet service associated with the customer has not been authenticated in response to a check authentication option; a message indicating that the Internet service associated with the customer has not been authenticated and indicating without outage; a message indicating that the Internet service associated with the customer has not been authenticated and indicating existing outage; a message indicating that the Internet service associated with the customer has not been authenticated and indicating emerging outage; a message indicating that there are no active broadband services; a message indicating that no high speed Internet ("HSI") assignment record has been found; a message indicating a missing required parameter; a message indicating success in response to selecting a check aggregator option; a message indicating success and indicating true html format in response to selecting a check aggregator option; a message indicating invalid aggregator type; a message indicating successful test result with no issues in response to selecting a metallic line test ("MLT") option; a message indicating successful test result with ring to ground low resistance issues detected in response to selecting a MLT option; a message indicating successful test result multiple issues detected in response to selecting a MLT option; a message indicating that a device is not configured for MLT; a message indicating that metallic line testing is not available for a device type; a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues, and/or the like; a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues, and/or the like; a message indicating virtual cross connect ("VCC") data comprising at least one of whether one or more cross connect issues have been detected, or details regarding any detected cross connect issues, and/or the like; a message indicating successful rebuild of network switch provisioning; a message indicating a missing nonce error; a message indicating an invalid nonce error; a message indicating success pertaining to clearing of IP leases to release IP addresses for use by other devices; a message indicating an error pertaining to a missing required parameter; or a message indicating an error pertaining to an unsupported device; and/or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

in response to receiving a request by a call center user to access an Internet service customer account on behalf of a customer, accessing, using a computing system, information regarding the Internet service customer account and regarding an Internet profile associated with the Internet service customer account that are stored in a database, the call center user being associated with a service provider that provides Internet service to customer premises equipment ("CPE") disposed within customer premises associated with the customer;

identifying, using the computing system, at least one network switch among a plurality of network switches in a network that is configured to provide Internet service to the CPE associated with the customer, based at least in part on the accessed information;

autonomously accessing, using the computing system, the identified at least one network switch, and diagnosing, using the computing system, the Internet service provided to the CPE via the identified at least one network switch, wherein diagnosing the Internet service comprises determining whether the CPE has an Internet Protocol ("IP") address;

based on a determination that the CPE does not have an IP address, autonomously accessing, using the computing system, one or more other CPEs communicatively coupled to the identified at least one network switch, and determining whether each of the one or more other CPEs has an IP address;

based on a determination that the CPE does not have an IP address but the one or more other CPEs have IP addresses, initiating, using the computing system, one or more first diagnosis and repair procedures on the CPE, and generating, using the computing system, a first message indicating information regarding potential issues with the CPE and indicating that the one or more first diagnosis and repair procedures have been initiated on the CPE;

based on a determination that the CPE and at least one other CPE among the one or more other CPEs do not have IP addresses, initiating, using the computing system, one or more second diagnosis and repair procedures on one or more of the identified at least one network switch or an aggregator node serving the identified at least one network switch, and generating, using the computing system, a second message indicating information regarding potential issues with the one or more of the identified at least one network switch or the aggregator node and indicating that the one or more second diagnosis and repair procedures have been initiated on the one or more of the identified at least one network switch or the aggregator node; and generating and presenting, using the computing system, a user interface ("UI") displaying at least one of the accessed information regarding the Internet service customer account, the accessed information regarding the Internet profile, the first message, or the second message.

2. The method of claim 1, wherein the computing system comprises at least one of a network diagnostics computing system, a network provisioning computing system, a network service management computing system, a call center computing system, a server computer, a webserver, a cloud computing system, or a distributed computing system.

3. The method of claim 1, wherein the Internet service comprises at least one of Internet service via digital subscriber line ("DSL")-based technologies ("xDSL"), Internet service via coaxial cable-based technologies, Internet service via fiber optics-based technologies, or Internet service via copper wire-based technologies.

4. The method of claim 1, wherein the identified at least one network switch comprises a digital subscriber line access multiplexers ("DSLAM") among a plurality of DSLAMs in the network, wherein the CPE comprises a DSL-based modulator-demodulator ("modem").

5. The method of claim 4, wherein at least one of the one or more first repair procedures and the one or more second repair procedures comprise at least one of:

remote, network-based diagnostics and repair, initiated by the computing system, of the DSL-based modem, wherein the remote, network-based diagnostics and repair of the DSL-based modem comprises at least one of remote restarting or rebooting, remote reconfiguration, remote software updating, or remote port bouncing of the DSL-based modem;

remote, network-based metallic line diagnostics and repair, initiated by the computing system, of copper lines between the identified DSLAM and the customer premises associated with the customer;

remote, network-based switch level diagnostics and repair, initiated by the computing system, of the identified DSLAM, wherein the remote, network-based diagnostics and repair of the identified DSLAM comprises at least one of remote restarting or rebooting, remote reconfiguration, remote software updating, or remote port bouncing of the identified DSLAM; or remote, network-based diagnostics and repair, initiated by the computing system, of one or more nodes in the network that are communicatively coupled with the identified DSLAM, wherein the remote, network-based diagnostics and repair of the identified DSLAM comprises at least one of remote restarting or rebooting, remote reconfiguration, remote software updating, or remote port bouncing of the one or more nodes, wherein the one or more nodes comprise at least one of one or more broadband remote access servers ("BRAS"), one or more aggregator nodes, or one or more Internet nodes.

6. The method of claim 1, wherein the identified at least one network switch comprises an optical line terminal ("OLT") among a plurality of OLTs in the network, wherein the CPE comprises an optical network unit ("ONU") or an optical network terminal ("ONT").

7. The method of claim 6, wherein at least one of the one or more first repair procedures and the one or more second repair procedures comprise at least one of:

remote, network-based diagnostics and repair, initiated by the computing system, of the ONU or ONT, wherein the remote, network-based diagnostics and repair of the ONU or ONT comprises at least one of remote restarting or rebooting, remote reconfiguration, remote software updating, or remote port bouncing of the ONU or ONT;

remote, network-based metallic line diagnostics and repair, initiated by the computing system, of optical fiber lines between the OLT and the customer premises associated with the customer;

remote, network-based switch level diagnostics and repair, initiated by the computing system, of the OLT, wherein the remote, network-based diagnostics and repair of the OLT comprises at least one of remote restarting or rebooting, remote reconfiguration, remote software updating, or remote port bouncing of the OLT; or remote, network-based diagnostics and repair, initiated by the computing system, of one or more nodes in the network that are communicatively coupled with the OLT, wherein the remote, network-based diagnostics and repair of the OLT comprises at least one of remote restarting or rebooting, remote reconfiguration, remote software updating, or remote port bouncing of the one or more nodes, wherein the one or more nodes comprise at least one of one or more core switches, one or more aggregator nodes, or one or more Internet nodes.

8. The method of claim 1, wherein the UI is generated and presented via a web portal to which the call center user is logged in.

9. The method of claim 1, wherein accessing the information regarding the Internet service customer account and regarding the Internet profile that are stored in the database comprises accessing the database via a first application programming interface ("API") between the computing system and the database, wherein autonomously accessing the identified at least one network switch comprises autonomously accessing the identified at least one network switch via a second API between the computing system and each of the identified at least one network switch, wherein autonomously accessing the one or more other CPEs communicatively coupled to the identified at least one network switch comprises autonomously accessing, using the computing system, the one or more other CPEs communicatively coupled to the identified at least one network switch via one or more third APIs between the computing system and the one or more other CPEs.

10. The method of claim 1, wherein initiating the one or more second diagnosis and repair procedures comprises initiating, using the computing system, the one or more second diagnosis and repair procedures on the aggregator node serving the identified at least one network switch, wherein initiating the one or more second diagnosis and repair procedures on the aggregator node comprises autonomously accessing the aggregator node via a fourth API between the computing system and the aggregator node.

11. The method of claim 1, further comprising:
based on a determination that the CPE does have an IP address and based on a determination that measured Internet speed or Internet bandwidth does not match subscribed Internet speed or Internet bandwidth within a predetermined threshold amount, autonomously accessing and diagnosing successively, using the computing system, each of the CPE, the at least one network switch, the one or more other CPEs communicatively coupled to the identified at least one network switch, the aggregator node, or an Internet router until a source of discrepancy in Internet speed or Internet bandwidth is found among these components; and based on a determination that one of the CPE, the at least one network switch, the aggregator node, or the Internet router is determined to be the source of discrepancy in Internet speed or Internet bandwidth, initiating, using the computing system, one or more third diagnosis and repair procedures on the one of the CPE, the at least one network switch, the aggregator node, or the Internet router, and generating, using the computing system, a third message indicating that the one or more third diagnosis and repair procedures have been initiated on the one of the CPE, the at least one network switch, the aggregator node, or the Internet router to address the discrepancy in Internet speed or Internet bandwidth.

12. The method of claim 11, wherein each of initiating the one or more first diagnosis and repair procedures, initiating the one or more second diagnosis and repair procedures, or initiating the one or more third diagnosis and repair procedures comprises one of:
autonomously initiating, using the computing system, respective one of the one or more first diagnosis and repair procedures, the one or more second diagnosis and repair procedures, or the one or more third diagnosis and repair procedures; or initiating, using the computing system, respective one of the one or more first diagnosis and repair procedures, the one or more second diagnosis and repair procedures, or the one or more third diagnosis and repair procedures in response to receiving a selection, by the call center user, of a master fix option that is generated and displayed within the UI, the master fix option encapsulating consolidation of a plurality of issues diagnosed by the computing system and corresponding repair procedures within a single repair option without distillation into separate repair options for each diagnosed issue.

13. The method of claim 1, wherein diagnosing Internet service provided to the CPE via the identified at least one network switch further comprises at least one of:
determining whether there is intermittent connection between the CPE and one or more of the identified at least one network switch, the aggregator node, or an Internet router based on current or historical diagnosis;

determining whether there is a Layer 3 traffic issue in which there is no IP address due to the network not being recognized;

determining whether there is a no browse issue in which there is an IP address but no connection; or determining whether Internet speed or Internet bandwidth is reduced compared with subscribed Internet speed or Internet bandwidth beyond a threshold amount.

14. The method of claim 13, further comprising:
based on a determination that the CPE does not have an IP address but the one or more other CPEs have IP addresses, determining, using the computing system, whether the lack of IP address can be addressed by at least one of:
the CPE being powered on or rebooted;
changing or updating configuration settings on the CPE; or
fixing any issues with one or more Internet communication lines within the customer premises;

based on a determination that the CPE does not have an IP address and at least one other CPE among the one or more other CPEs do not have IP addresses, determining, using the computing system, whether the lack of IP address can be addressed by at least one of:
fixing the identified at least one network switch that is determined to be offline or non-functional;
changing or updating configuration settings on the identified at least one network switch; or
fixing any partial or complete cuts in one or more Internet communication lines between the identified at least one network switch and the CPE;
based on a determination that there is intermittent connection between the CPE and one or more of the identified at least one network switch, the aggregator node, or the Internet router, determining, using the computing system, whether the intermittent connection can be addressed by at least one of:
the CPE being powered on or rebooted;
fixing any errors building on one or more Internet communication lines between the CPE and the one or more of the identified at least one network switch, the aggregator node, or the Internet router; or
fixing any partial or complete cuts in one or more Internet communication lines between the CPE and the one or more of the identified at least one network switch, the aggregator node, or the Internet router;
based on a determination that there is a Layer 3 traffic issue in which there is no IP address due to the network not being recognized, determining, using the computing system, whether the Layer 3 traffic issue can be addressed by at least one of:
fixing any potential sources of the Layer 3 traffic issue in the identified at least one network switch;
fixing any potential sources of the Layer 3 traffic issue in the aggregator node; or
fixing any potential sources of the Layer 3 traffic issue in the Internet router;
based on a determination that there is a no browse issue in which there is an IP address but no connection, determining, using the computing system, whether the no browse issue can be addressed by at least one of:
rebuilding the Internet profile associated with the Internet service customer account;
bouncing one or more ports of the identified at least one network switch; or
causing the CPE to request a new IP address; and
based on a determination that Internet speed or Internet bandwidth is reduced compared with subscribed Internet speed or Internet bandwidth beyond a threshold amount, determining, using the computing system, whether the reduced Internet speed or Internet bandwidth can be addressed by at least one of:
changing, updating, or correcting the Internet profile associated with the Internet service customer account;
changing or updating configuration settings in the CPE;
changing or updating configuration settings in the identified at least one network switch;
changing or updating configuration settings in the aggregator node;
replacing the CPE; or
rerouting network traffic through one or more other nodes in the network.

15. The method of claim 1, further comprising initiating the additional repair procedures comprising at least one of:
dispatching a technician associated with the service provider to perform on-site repair procedures at the customer premises;
dispatching a technician associated with the service provider to perform on-site repair procedures at the at least one network switch; or
dispatching a technician associated with the service provider to perform on-site repair procedures at a physical location at which one or more nodes of the network are disposed.

16. The method of claim 1, wherein the accessed information regarding the Internet service customer account comprises at least one of:
billing information associated with the Internet service customer account;
customer line information associated with the Internet service customer account;
line-specific information associated with the Internet service provided to the customer;
network profile information associated with the Internet service provided to the customer;
identification information of each of the at least one network switch;
switch information for each of the at least one network switch;
information regarding one or more features of the Internet service provided to the customer;
information regarding any requested buried service wire ("BSW") tickets; or
information regarding manual switch access for each of the at least one network switch.

17. The method of claim 1, further comprising:
autonomously accessing, using the computing system and from a billing database, billing information associated with the Internet service customer account; and
generating and presenting, using the computing system, the billing information within the UI for the call center user.

18. The method of claim 1, further comprising:
generating and presenting, using the computing system, one or more options within the UI for the call center user to select to change at least one of one or more features of the Internet service customer account or one or more features of the Internet service provided to the CPE;
receiving, using the computing system, one or more response messages in response to the call center user selecting at least one option among the one or more options; and
generating and presenting, using the computing system, the one or more response messages within the UI for the call center user;
wherein the one or more response messages comprise at least one of:
a message indicating success;
a message indicating no network inventory records found;
a message indicating an application programming interface ("API") error;
a message indicating an unsupported device with respect to the identified at least one network switch;
a message indicating that the Internet service associated with the customer has been authenticated in response to a check authentication option;
a message indicating that the Internet service associated with the customer has been authenticated and indicating without outage;
a message indicating that the Internet service associated with the customer has been authenticated and indicating with ping failure but without outage;

a message indicating that the Internet service associated with the customer has not been authenticated in response to a check authentication option;
a message indicating that the Internet service associated with the customer has not been authenticated and indicating without outage;
a message indicating that the Internet service associated with the customer has not been authenticated and indicating existing outage;
a message indicating that the Internet service associated with the customer has not been authenticated and indicating emerging outage;
a message indicating that there are no active broadband services;
a message indicating that no high speed Internet ("HSI") assignment record has been found;
a message indicating a missing required parameter;
a message indicating success in response to selecting a check aggregator option;
a message indicating success and indicating true html format in response to selecting a check aggregator option;
a message indicating invalid aggregator type;
a message indicating successful test result with no issues in response to selecting a metallic line test ("MLT") option;
a message indicating successful test result with ring to ground low resistance issues detected in response to selecting a MLT option;
a message indicating successful test result multiple issues detected in response to selecting a MLT option;
a message indicating that a device is not configured for MLT;
a message indicating that metallic line testing is not available for a device type;
a message indicating line data comprising at least one of provisioned downstream data rate, provisioned upstream data rate, downstream synchronization rate, upstream synchronization rate, downstream signal to noise margin, upstream signal to noise margin, downstream attenuation value, upstream attenuation value, whether a port is in sync, whether one or more line issues have been detected, or details regarding any detected line issues;
a message indicating port provisioning data comprising at least one of actual downstream data rate, actual upstream data rate, purchased downstream data rate, purchased upstream data rate, whether a port is enabled, a configured bonding group identification ("ID") value, whether the actual downstream or upstream data rate matches corresponding purchased downstream or upstream data rate, whether one or more port profile issues have been detected, or details regarding any detected port profile issues;
a message indicating virtual cross connect ("VCC") data comprising at least one of whether one or more cross connect issues have been detected, or details regarding any detected cross connect issues;
a message indicating successful rebuild of network switch provisioning;
a message indicating a missing nonce error;
a message indicating an invalid nonce error;
a message indicating success pertaining to clearing of IP leases to release IP addresses for use by other devices;
a message indicating an error pertaining to a missing required parameter; or
a message indicating an error pertaining to an unsupported device.

19. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
in response to receiving a request by a call center user to access an Internet service customer account on behalf of a customer, access information regarding the Internet service customer account and regarding an Internet profile associated with the Internet service customer account that are stored in a database, the call center user being associated with a service provider that provides Internet service to customer premises equipment ("CPE") disposed within customer premises associated with the customer;
identify at least one network switch among a plurality of network switches in a network that is configured to provide Internet service to the CPE associated with the customer, based at least in part on the accessed information;
autonomously access the identified at least one network switch, and diagnose the Internet service provided to the CPE via the identified at least one network switch, wherein diagnosing the Internet service comprises determining whether the CPE has an Internet Protocol ("IP") address;
based on a determination that the CPE does not have an IP address, autonomously access one or more other CPEs communicatively coupled to the identified at least one network switch, and determine whether each of the one or more other CPEs has an IP address;
based on a determination that the CPE does not have an IP address but the one or more other CPEs have IP addresses, initiate one or more first diagnosis and repair procedures on the CPE, and generate a first message indicating information regarding potential issues with the CPE and indicating that the one or more first diagnosis and repair procedures have been initiated on the CPE;
based on a determination that the CPE and at least one other CPE among the one or more other CPEs do not have IP addresses, initiate one or more second diagnosis and repair procedures on one or more of the identified at least one network switch or an aggregator node serving the identified at least one network switch, and generate a second message indicating information regarding potential issues with the one or more of the identified at least one network switch or the aggregator node and indicating that the one or more second diagnosis and repair procedures have been initiated on the one or more of the identified at least one network switch or the aggregator node; and
generate and present a user interface ("UI") displaying at least one of the accessed information regarding the Internet service customer account, the accessed information regarding the Internet profile, the first message, or the second message.

20. A system, comprising:
a plurality of network switches in a network;

a computing system, comprising:
- at least one first processor; and
- a first non-transitory computer readable medium communicatively coupled to the at least one first processor, the first non-transitory computer readable medium having stored thereon computer software comprising a first set of instructions that, when executed by the at least one first processor, causes the computing system to:
  - in response to receiving a request by a call center user to access an Internet service customer account on behalf of a customer, access information regarding the Internet service customer account and regarding an Internet profile associated with the Internet service customer account that are stored in a database, the call center user being associated with a service provider that provides Internet service to customer premises equipment ("CPE") disposed within customer premises associated with the customer;
  - identify at least one network switch among the plurality of network switches in the network that is configured to provide Internet service to the customer premises associated with the customer, based at least in part on the accessed information;
  - autonomously access the identified at least one network switch, and diagnose the Internet service provided to the CPE via the identified at least one network switch, wherein diagnosing the Internet service comprises determining whether the CPE has an Internet Protocol ("IP") address;
  - based on a determination that the CPE does not have an IP address, autonomously access one or more other CPEs communicatively coupled to the identified at least one network switch, and determine whether each of the one or more other CPEs has an IP address;
  - based on a determination that the CPE does not have an IP address but the one or more other CPEs have IP addresses, initiate one or more first diagnosis and repair procedures on the CPE, and generate a first message indicating information regarding potential issues with the CPE and indicating that the one or more first diagnosis and repair procedures have been initiated on the CPE;
  - based on a determination that the CPE and at least one other CPE among the one or more other CPEs do not have IP addresses, initiate one or more second diagnosis and repair procedures on one or more of the identified at least one network switch or an aggregator node serving the identified at least one network switch, and generate a second message indicating information regarding potential issues with the one or more of the identified at least one network switch or the aggregator node and indicating that the one or more second diagnosis and repair procedures have been initiated on the one or more of the identified at least one network switch or the aggregator node; and
  - generate and present a user interface ("UI") displaying at least one of the accessed information regarding the Internet service customer account, the accessed information regarding the Internet profile, the first message, or the second message.

* * * * *